United States Patent
Kuramochi et al.

[11] Patent Number: 6,077,581
[45] Date of Patent: Jun. 20, 2000

[54] ABRASIVE SHAPED ARTICLE, ABRASIVE DISC AND POLISHING METHOD

[75] Inventors: Hideto Kuramochi, Yokohama; Yoshitaka Kubota, Sagamihara, both of Japan

[73] Assignee: Tosoh Corporation, Yamaguchi, Japan

[21] Appl. No.: 08/903,993

[22] Filed: Jul. 31, 1997

[30] Foreign Application Priority Data

Jul. 31, 1996 [JP] Japan ..................................... 8-201975

[51] Int. Cl.[7] ........................................................ B32B 3/00

[52] U.S. Cl. ...................... 428/64.1; 428/66.2; 428/323; 428/327; 428/404; 428/446

[58] Field of Search .................................. 428/64.1, 66.2, 428/323, 327, 446, 404

[56] References Cited

U.S. PATENT DOCUMENTS

| | | | |
|---|---|---|---|
| 4,544,604 | 10/1985 | Usui | 428/327 |
| 5,401,568 | 3/1995 | Hahn | 428/323 |
| 5,418,043 | 5/1995 | Ogawa | 428/323 |

*Primary Examiner*—Nassar Ahmad
*Attorney, Agent, or Firm*—Sughrue, Mion, Zinn, Macpeak & Seas, PLLC

[57] ABSTRACT

An abrasive shaped article composed of at least 90% by weight, based on the weight of the abrasive shaped article, of silica and having a bulk density of 0.2 g/cm$^3$ to 1.5 g/cm$^3$, a BET specific surface area of 10 m$^2$/g to 400 m$^2$/g and an average particle diameter of 0.001 μm to 0.5 μm. An abrasive disc having fitted thereto at least one of the abrasive shaped article is advantageously used for polishing a material such as substrate. Preferably at least two kinds of abrasive shaped articles are fitted to the supporting auxiliary, at least one kind of which has a bulk density of 0.7 g/cm$^3$ to 1.5 g/cm$^3$ and at least one kind of which has a bulk density of at least 0.2 g/cm$^3$ but smaller than 0.7 g/cm$^3$.

3 Claims, 10 Drawing Sheets

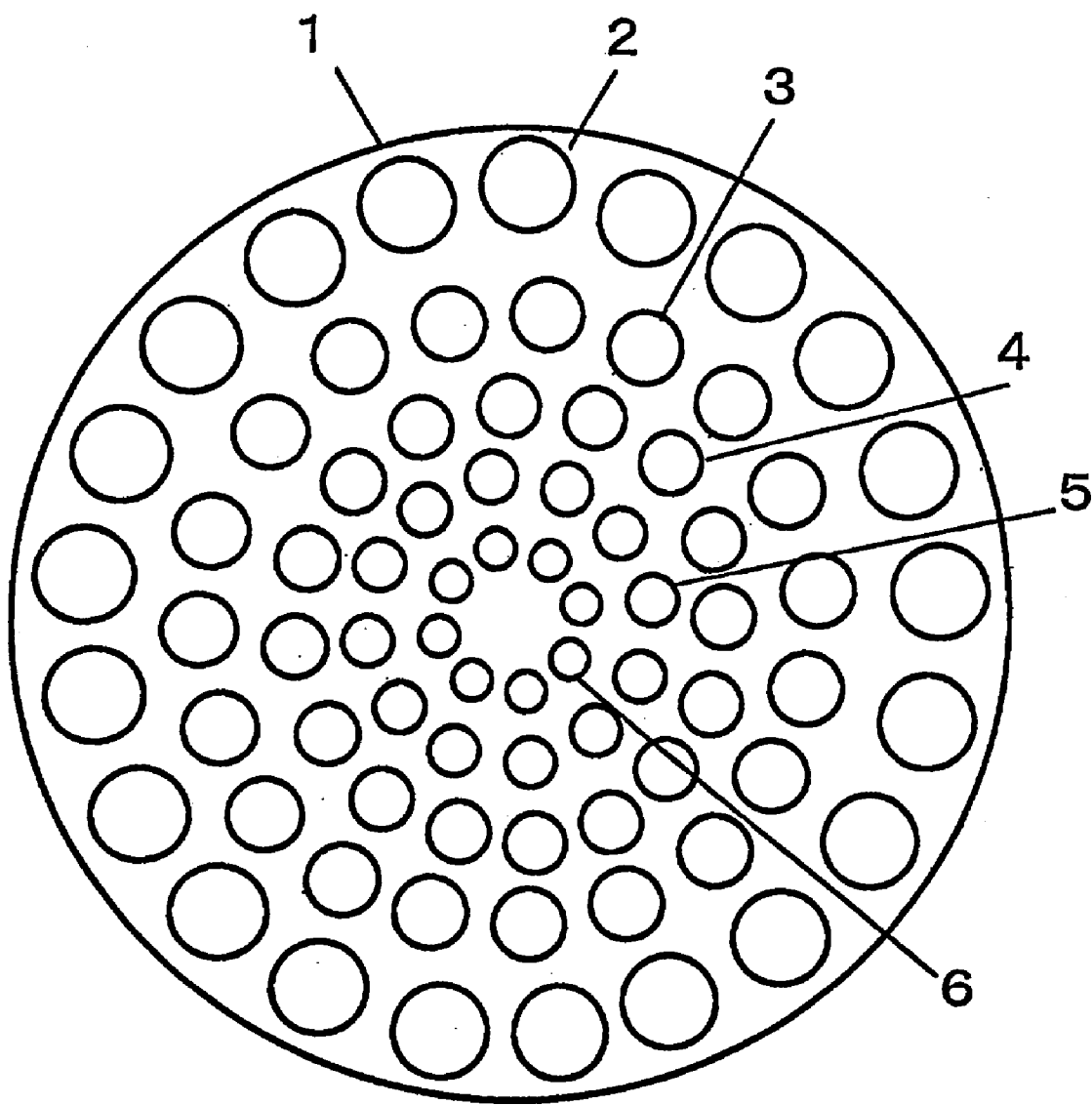
F I G. 1

GROUP I  GROUP II

ABRASIVE SHAPED ARTICLE, ABRASIVE DISC AND POLISHING METHOD

BACKGROUND OF THE INVENTION

1. Field of the Invention

This invention relates to an abrasive shaped article used for polishing a substrate material such as a silicon wafer and an oxide substrate, and an optical material; an abrasive disc comprising the abrasive shaped article; and a polishing method. More particularly it relates to an abrasive shaped article made by shaping an ultrafine silica powder into a shaped article, and sintering the shaped article; an abrasive disc comprising the abrasive shaped silica article and a supporting auxiliary; and a polishing method using the abrasive shaped silica article.

2. Description of the Related Art

In a process for polishing a substrate material such as a silicon wafer or an oxide substrate, a loose abrasive polishing procedure has heretofore been employed wherein the substrate material is polished with a polishing pad made of nonwoven fabric or suede cloth, while a polishing liquid comprising a loose abrasive grain such as colloidal silica or cerium oxide, and a chemical such as potassium hydroxide is continuously supplied onto the substrate material. For example, it is described in Japanese Unexamined Patent Publication (abbreviated to "JP-A") 5-154760 and JP-A 7-326597 that a silicon wafer is polished with a polishing cloth and a loose abrasive grain. In the conventional loose grain polishing procedures using a loose grain-containing polishing liquid, a salient amount of a waste polishing liquid containing a loose grain is produced during polishing, and therefore, the efficiency of the polishing procedure, equipment for waste disposal and environmental pollution with the waste polishing liquid must be considered. The polishing pad such as polishing cloth is liable to be clogged and the polishing performance is deteriorated, and thus the polishing pad must be often renewed and the polishing efficiency is decreased.

Further, the conventional polishing procedure using a polishing pad has a problem such that the surface of the polishing pad is pliable and therefore the entire surface of a material to be polished is not uniformly abraded, i.e., the corner portions of the material surface are excessively abraded upon polishing.

To sum up, the conventional polishing procedure using a polishing pad and a loose abrasive grain bears problems in the disposal of waste polishing liquid, the working efficiency of polishing, and the uniformity in abrasion of the entire material surface to be polished.

SUMMARY OF THE INVENTION

An object of the present invention is to provide an abrasive shaped article which is used for polishing a material such as a substrate material, for example, a substrate for a semiconductor device, such as a silicon wafer, and an oxide substrate, and an optical material for which a precision working is required; and which has advantages such that the problem of waste disposal can be mitigated or avoided, a polished surface with precision of the same degree as or higher degree than that achieved by the conventional polishing procedure using a polishing pad and a loose abrasive grain can be obtained, the material can be polished with enhanced efficiency, the abrasive shaped article has an improved durability and economics of the polishing working can be achieved.

Another object of the present invention is to provide an abrasive disc and a polishing process, which have the above-mentioned advantages.

As the results of research for achieving the above objects, the inventors have found that when an abrasive shaped article composed of ultrafine silica particles is used as an abrasive, the following advantages can be obtained.

(1) The hard and fine abrasive surfaces of silica particles are brought into direct contact with a material to be polished, and, therefore, a polishing liquid which does not contain loose abrasive grains such as colloidal silica or cerium oxide can be used. The silica particles fall off only to a very minor amount from the abrasive shaped article, and, therefore, the problem of waste liquid disposal can be mitigated or avoided.

(2) The abrasive shaped article composed of ultrafine silica particles has a high tenacity and an enhanced durability. Therefore, the polishing operation can be A continued for a long period without renewal of the abrasive shaped article.

(3) The smooth finish and the rate of polishing achieved with the abrasive shaped article are of the same levels as or higher than those of the conventional polishing procedure using a polishing pad and a loose abrasive grain. The smooth finish and the rate of polishing are not decreased with a lapse of polishing time.

(4) If an abrasive loose grain is used in combination with the abrasive shaped article of the invention, a more enhanced rate of polishing can be achieved with a polishing liquid containing the abrasive loose grain at a lower concentration.

The present invention has been completed based on the above-listed findings.

In one aspect of the present invention, there is provided an abrasive shaped article comprising at least 90% by weight of silica (namely, silicon dioxide) and having a bulk density of 0.2 g/cm$^3$ to 1.5 g/cm$^3$, a BET specific surface area of 10 m$^2$/g to 400 m$^2$/g and an average particle diameter of 0.001 $\mu$m to 0.5 $\mu$m.

In another aspect of the present invention, there is provided an abrasive disc comprising one or more of the above-mentioned abrasive shaped article and a supporting auxiliary, said abrasive shaped article or articles being fitted to the supporting auxiliary.

In still another aspect of the present invention, there is provided a process for polishing a material by using the above-mentioned abrasive disc.

BRIEF DESCRIPTION OF THE DRAWINGS

FIG. 1 is a plan view showing an example of the abrasive disc of the present invention;

DESCRIPTION OF THE PREFERRED EMBODIMENTS

Characteristics of Abrasive Shaped Article

Figure 2:
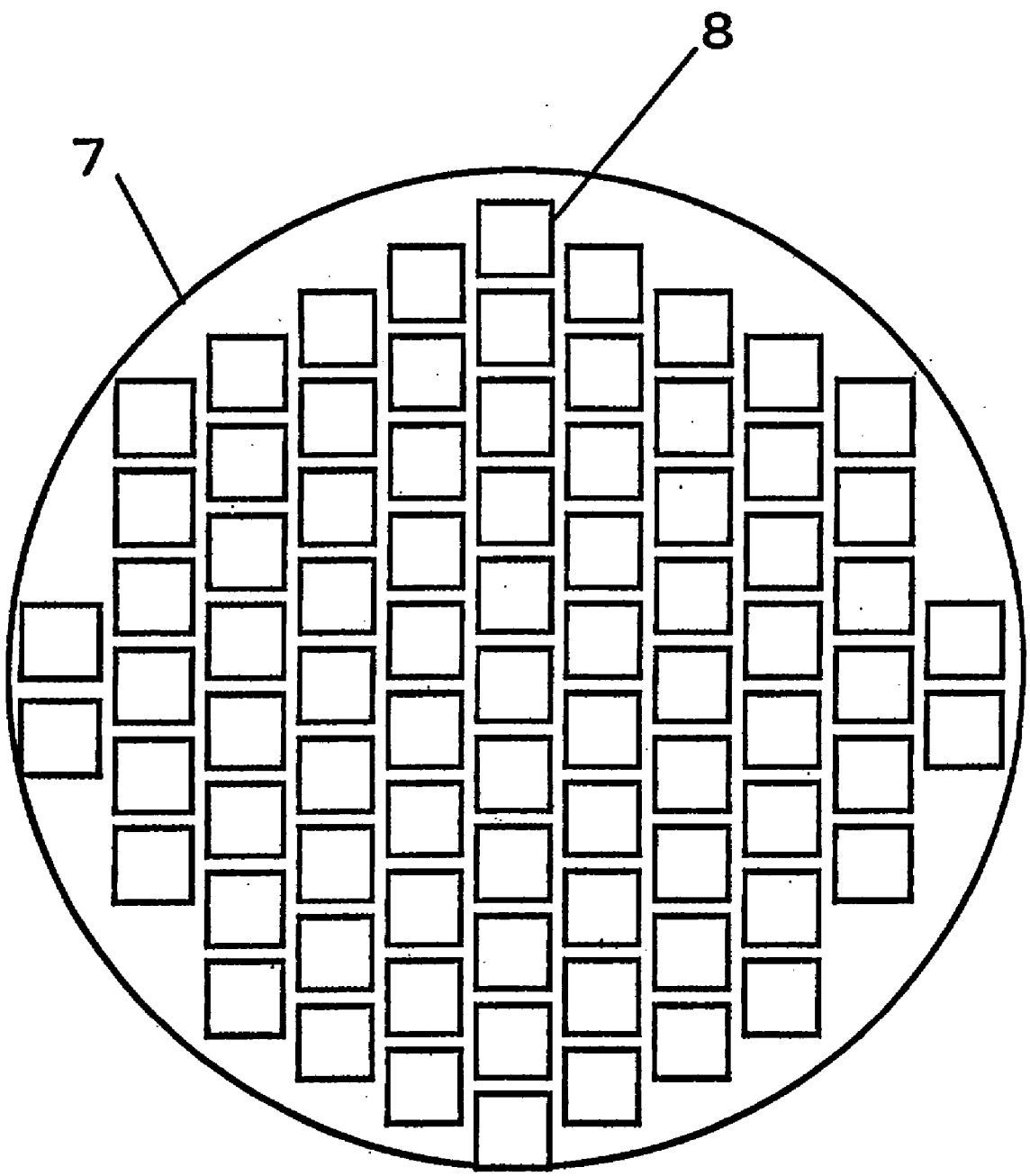
FIG. 2 is a plan view showing another example of the abrasive disc of the present invention.

The abrasive shaped article of the present invention is substantially composed of silica, namely, silicon dioxide. By the term "substantially" used herein we mean that the abrasive shaped article comprises at least 90% by weight of silicon dioxide based on the absolute dry weight of the abrasive shaped article. As specific examples of the silica used in the present invention, there can be mentioned dry process silica and wet process silica. Usually the silica used contains minor amount of materials which is capable of being removed by ignition, and trace amounts of metal oxides such as, for example, $Al_2O_3$, $Fe_2O_3$, $TiO_2$, CaO, MgO and $Na_2O$.

To keep the shape of the abrasive shaped article and the abrading action thereof during polishing, and achieve a smoothed polished surface with a high efficiency, the bulk density of the abrasive shaped article is in the range of 0.2 to 1.5 g/cm$^3$, and preferably in the range of 0.4 to 0.9 g/cm$^3$. If the bulk density is smaller than 0.2 g/cm$^3$, the abrasive shaped article cannot keep its shape during polishing and thus is liable to be excessively abraded. If the bulk density exceeds 1.5 g/cm$^3$, the tenacity of the abrasive shaped article is too high, the material to be polished is occasionally marred, and further the abrasive shaped article is liable to be abraded and become smooth and the rate of polishing is deteriorated.

To keep the shape of the abrasive shaped article and the abrading action thereof during polishing, and achieve a smooth polished surface with a high efficiency, the BET specific surface area of the abrasive shaped article is in the range of 10 to 400 m$^2$/g, preferably in the range of 10 to 200 m$^2$/g, and more preferably in the range of 10 to 100 m$^2$/g. If the BET specific surface area exceeds 400 m$^2$/g, the abrasive shaped article cannot keep its shape during polishing and thus is liable to be excessively abraded. If the BET specific surface area is smaller than 10 m$^2$/g, the tenacity of the abrasive shaped article is too high, the material to be polished is occasionally marred, and further, the abrasive shaped article is liable to be abraded and becomes undesirably smooth and the rate of polishing is deteriorated.

To obtain easily a porous abrasive shaped article from the superfine silica particles, and achieve a smooth polished surface with a high efficiency, the average particle diameter of silica particles in the abrasive shaped article is in the range of 0.001 to 0.5 μm, preferably in the range of 0.01 to 0.3 μm and more preferably in the range of 0.03 to 0.2 μm. If the average particle diameter in the abrasive shaped article is smaller than 0.001 μm, the primary particle diameter of the superfine silica particles used is smaller than 0.001 μm, and, thus, the superfine silica particles are difficult to shape into a porous shaped article. If the average particle diameter in the abrasive shaped article is larger than 0.5 μm, the polished material occasionally has polish marks. By the term "average particle diameter" used herein we mean the average particle diameter of the silica particles present on the surface of the abrasive shaped article, which can be measured by using, for example, a scanning electron microscope (SEM) as explained below in the working examples.

To keep the shape of the abrasive shaped article and the abrading action thereof during polishing, and achieve a smooth polished surface with a high efficiency, it is preferable that the abrasive shaped article having the above-mentioned characteristics has an integrated total pore volume in the range of 0.3 to 4 cm$^3$/g. Further, the abrasive shaped article preferably has a pore size distribution such that the integrated pore volume of pores having a diameter not larger than 1 μm is at least 80% of the integrated total pore volume of the entire pores in the abrasive shaped article; the integrated pore volume of pores having a diameter not larger than 0.1 μm is at least 10% of the integrated total pore volume of the entire pores in the abrasive shaped article; the pore mode diameter is in the range of 0.01 to 0.3 μm; and the pore median diameter is in the range of 0.01 to 0.3 μm.

By the term "the pore mode diameter" used herein we mean the pore diameter at which the differential value is the largest in the differential pore diameter distribution. By the term "the pore median diameter" used herein we mean the pore diameter corresponding to the median value between the largest value of the integral pore volume and the smallest value thereof in the integral pore diameter distribution. Note, both the pore mode diameter and the pore median diameter are based on the volume.

Process for Producing the Abrasive Shaped Article

The process for producing the abrasive shaped article is not particularly limited provided that the product has the above-mentioned characteristics. Usually a superfine powdery silica raw material is shaped into a shaped article, and the shaped article is then sintered. The shaping of the raw material is conducted, for example, by press-molding the superfine silica powder. The molding pressure employed is preferably at least 5 kg/cm$^2$ and more preferably 10 kg/cm$^2$.

To enhance the shapability of the superfine silica powder, the silica powder may be pre-treated. For example, the silica powder is pre-shaped into a granular material, for example, by press-granulating the silica powder, followed by classification of the granular material for example, by using a sieve. The pressure employed for the pre-shaping varies depending upon the particular nature of the silica powder and is not particularly limited, but is usually in the range of 5 to 1,000 kg/cm$^2$.

As other procedures for enhancing the shapability of the silica powder, there can be mentioned a procedure for granulating the silica powder into granules by spray-drying or rolling, a procedure of adding a binder or a wax into the silica powder, and a procedure of adding water into the silica powder, followed by drying prior to sintering the shaped silica powder.

When an organic material such as a binder or wax is added to the silica powder to enhance shapability, the shaped product of the organic material-added silica powder is preferably subjected to a treatment for removing the organic material after shaping but before sintering the shaped product. The treating procedure is not particularly limited. For example, the shaped product of the organic material-added silica powder is heated in an air atmosphere or an inert gas atmosphere such as nitrogen, argon or helium, whereby the organic material such as a binder or wax is removed. The heating may be carried out under an atmospheric, super-atmospheric or sub-atmospheric pressure.

The organic material-removed shaped product of the silica powder is sintered under heating for providing an abrasive shaped article having a high tenacity and a good durability. But, a procedure such as machining may also be employed for finishing the abrasive shaped article having a high tenacity.

Abrasive Disc

An abrasive disc comprising the above-mentioned abrasive shaped article, and a polishing process using the abrasive disc will now be described.

The abrasive disc is made by fitting one or more of the abrasive shaped article to a supporting auxiliary. The supporting auxiliary used includes structures having various shapes and made from various materials. The manner in which the abrasive shaped article is fitted to the supporting auxiliary is not particularly limited. For example, the abrasive shaped article and the supporting auxiliary are connected to each other with a binder, or the abrasive shaped article is fitted to or embedded in a depression or depressions of the supporting auxiliary.

Usually one or more of the abrasive shaped article are fitted to one supporting auxiliary. Preferably at least two abrasive shaped articles are fitted to one supporting auxiliary for the following reasons. First, when at least two abrasive shaped articles are fitted to one supporting auxiliary, a polishing liquid can be discharged with improved efficiency during polishing, and thus, the rate of polishing can be enhanced. More specifically when at least two abrasive shaped articles are fitted to a supporting auxiliary, the polishing liquid is discharged through drainage conduits formed between the adjacent abrasive shaped articles. When one abrasive shaped article is fitted to a supporting auxiliary, a conduit for draining a polishing liquid is preferably provided on the abrasion surface. Secondly, when at least two abrasive shaped articles are fitted to a supporting auxiliary, the rate of polishing can be substantially constant and the polishing can be effected substantially uniformly over the entire surface of the material, and the efficiency of polishing is enhanced.

The shape and size of the abrasive shaped article are not particularly limited provided that a desired number of the abrasibe shaped articles are capable of being fitted to a supporting auxiliary. As examples of the shape thereof, there can be mentioned a columnar pellet and a square piller shaped pellet having a triangular or quadrilateral cross-section.

For example, when one abrasive shaped article is fitted to a supporting auxiliary such as a disc-form, the size of the abrasive shaped article is usually somewhat smaller than the diameter of the usable area of the supporting auxiliary, which is usually in the range of 200 to 800 mm. When at least two abrasive shaped articles are fitted to the supporting auxiliary, the size of each shaped article is preferably such that each article falls within a square area, each side of which has a length of 5 to 100 mm. Thus, an abrasive shaped article of a columnar pellet shape preferably has a diameter of 5 to 100 mm and that of a square pillar shape preferably has a side length of 5 to 100 mm. Even if the size of the abrasive shaped article is smaller than 5 mm, the abrasive disc has a good polishing performance but has a poor practicality because of too many shaped articles fitted onto the disc surface. If the size of the abrasive shaped article is larger than 100 mm, the abrasive disc may have a good polishing performance, but it is inferior to the abrasive disc with abrasive shaped articles of a size of 5 to 100 mm. When the size of the abrasive shaped article is larger than 100 mm, one or more conduits are preferably provided on the polishing surface.

The thickness (i.e., the length perpendicular to the abrasion surface) of the abrasive shaped article is not particularly limited, but is preferably in the range of 3 to 20 mm. At a thickness smaller than 3 mm, the tenacity of the abrasive shaped article fitted to a supporting auxiliary is sometimes insufficient. In contrast, at a thickness exceeding 20 mm, the size of the abrasive disc becomes undesirably large.

The number of the abrasive shaped articles fitted to a supporting auxiliary is not particularly limited and varies depending upon the size of the abrasive shaped articles and the usable area of the supporting auxiliary to which the shaped articles are fitted. Preferably the number of the abrasive shaped articles is such that the ratio of the total area of the polishing surfaces of the abrasive shaped article to the total usable area on the surface of the supporting auxiliary is not larger than 95%. If this ratio is larger than 95%, the rate of polishing is reduced to a level similar to the case where one abrasive shaped article is fitted to a supporting auxiliary, and thus, the abrasive disc is inferior to that having fitted thereto two or more abrasive shaped articles. The minimum permissible value of the above-mentioned ratio is not particularly limited, but, is usually about 30%. At a ratio of smaller than about 30%, the usable area of the polishing surface of the abrasive shaped article is reduced.

The manner in which the abrasive shaped articles are fitted onto the supporting auxiliary is not particularly limited, provided that the abrasive shaped articles are substantially uniformly distributed over the entire usable area of the surface of the supporting auxiliary. The distribution of the abrasive shaped articles on the surface of supporting auxiliary may be random, but, to achieve good polishing efficiency irrespective of the portion of material to be polished, it is preferable that the distribution of the abrasive shaped articles is enantiomorphic relative to a center line drawn on the usable area of the surface of supporting auxiliary.

The size and shape of the supporting auxiliary are not particularly limited. The shape is, for example, flat square, disc-form, ring-form or cylindrical. The size is such that the diameter or side is usually in the range of 200 to 800 mm.

Distribution of the abrasive shaped articles will be illustrated with reference to the attached drawings. Referring to FIG. 1 which is a plan view showing an example of the abrasive disc of the present invention, five kinds of columnar pellets having different diameters 2, 3, 4, 5 and 6 as abrasive shaped articles are fitted to a supporting auxiliary 1 made of metal. The five kinds of columnar pellets 2, 3, 4, 5 and 6 are arranged on five concentric circles (not shown) in a pattern such that the columnar pellets having the largest diameter 2 are arranged on the outermost concentric circle, and the other four kinds of columnar pellets are arranged inwardly in the order of diameter size on the four concentric circles so that the columnar pellets having the smallest diameter 6 are arranged on the innermost concentric circle. This order of arrangement may be the very reverse, or the pellets may be arranged in voluntary order in the concentric circles. Alternatively, the pellets may be arranged in a voluntary pattern other than on the concentric circles, or at random.

Among the above-mentioned pattern of arrangement of the abrasive shaped articles, it is preferable that shaped articles of different diameters are arranged on concentric circles, and more preferably, in a pattern such that shaped articles of the same diameter are arranged on the same concentric circle. The number of kinds of the abrasive shaped articles is not particularly limited, and may be optional. The number of concentric circles also are not particularly limited.

Referring to FIG. 2 which is a plan view showing another example of the abrasive disc of the present invention, a plurality of square pillar-form pellets 8 as abrasive shaped articles are fitted to a supporting auxiliary 7 made of metal. The pellets 8 are arranged on parallel lines. There is no great difference between the pellet arrangement in FIG. 2 and that in FIG. 1 in polishing performances of the abrasive disc.

When a plurality of abrasive shaped articles are used, the abrasive shaped articles preferably have two or more different bulk densities. More specifically it is preferable to use a plurality of abrasive shaped articles, a part of which have a bulk density classified as group I below and the other part of which have a bulk density classified as group II below.

Group I: $0.7 \text{ g/cm}^3 \leq \text{bulk density} \leq 1.5 \text{ g/cm}^3$

Group II: $0.2 \text{ g/cm}^3 \leq \text{bulk density} < 0.7 \text{ g/cm}^3$

The combined use of at least two kinds of abrasive shaped articles having bulk densities classified as the groups I and II is beneficial in that the abrasive disc made therefrom has an enhanced durability, although the abrasive disc contains an abrasive shaped article having a low bulk density falling in the group II.

When at least two kinds of abrasive shaped articles having bulk densities classified as the groups I and II are used in combination, it is preferable that the total polishing surface area of the abrasive shaped articles having a bulk density classified as the group I and the total polishing surface area of the abrasive shaped articles having a bulk density classified as the group II occupy 30 to 90% and 70 to 10%, respectively based on the sum of the polishing surface areas of the entire abrasive shaped articles classified as the groups I and II. If the relative areal ratio of the polishing surface of group I to that of group II is smaller than 30%, the durability of the abrasive disc is liable to be poor. If the relative areal ratio of the polishing surface of group I to that of group II is larger than 90%, it is possible that the rate of polishing cannot be enhanced to the desired extent When at least two kinds of abrasive shaped articles having bulk densities classified as the groups I and II are used in combination, the shape of the shaped articles and the manner of arrangement thereof on a supporting auxiliary are not particularly limited. However, small columnar- or square pillar-form pellets having substantially the same shape are preferably used.

As regards the manner in which the shaped articles are arranged on a supporting auxiliary, it is preferable that abrasive shaped articles having a small bulk density of group II are arranged so that abrasive shaped articles surrounding the abrasive shaped articles of group II contains at least partly abrasive shaped articles of group I. In this preferable arrangement, abrasive shaped articles of group I having a high tenacity are believed to compensate those of group II for lack of tenacity. Namely it is believed that abrasive shaped articles of group II are relatively easily abraded during the course of polishing to produce finely divided particles which have an action of enhancing the rate of polishing, but abrasion of the abrasive shaped articles of group II is minimized by the adjacent abrasive shaped articles of group I.

Figure 3:
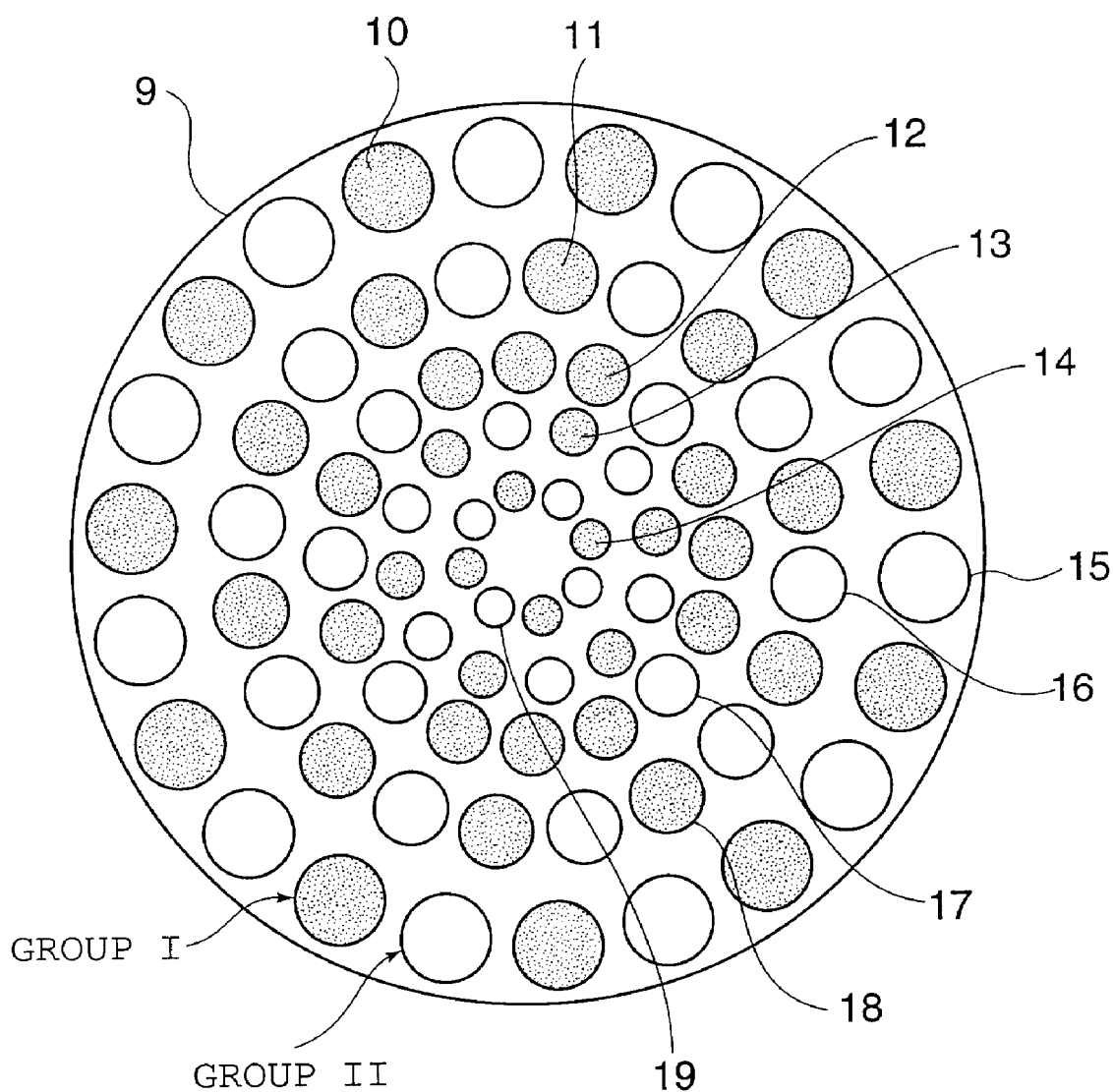
FIG. 3 is a plan view showing a modified example of the abrasive disc shown in FIG. 1.

Referring to FIG. 3 which is a plan view of a modified embodiment of the abrasive disc shown in FIG. 1, five kinds of abrasive shaped articles 10, 11, 12, 13 and 14 (shown as black circles) each having a bulk density falling in group I but having different sizes, and five kinds of abrasive shaped articles 15, 16, 17, 18 and 19 (shown as white circles) each having a bulk density falling in group II but having different sizes are arranged on a supporting auxiliary 9 made of metal. In this modified embodiment, the five kinds of columnar pellets of different sizes are arranged on five concentric circles (not shown) in a pattern such that the columnar pellets 10 and 15 having the largest diameter are arranged on the outermost concentric circle, and the other four kinds of columnar pellets of different sizes are arranged inwardly in the order of diameter size on the four concentric circles so that the columnar pellets 14 and 19 having the smallest diameter are arranged on the innermost concentric circle. This order of arrangement may be the very reverse, or the pellets may be arranged in voluntary order in the concentric circles. Alternatively, the pellets may be arranged in a voluntary pattern other than on the concentric circles, or at random. It is preferable that pellets of different diameters are arranged on concentric circles, and more preferably, in a pattern such that pellets of the same diameter are arranged on the same concentric circle. The number of sizes of the pellets is not particularly limited, and may be optional. The number of concentric circles also are not particularly limited.

Figure 4:
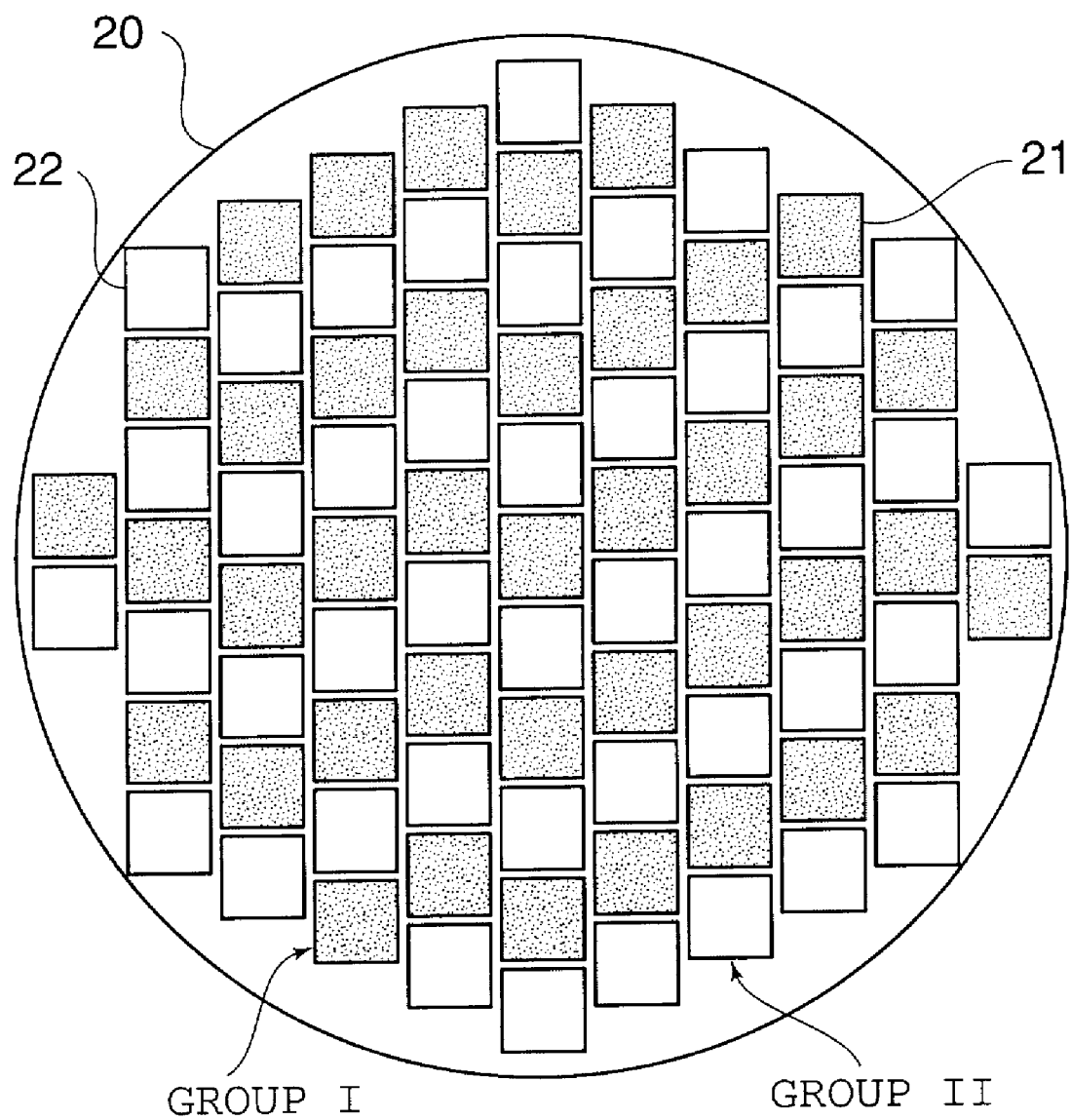
FIG. 4 is a plan view showing a modified example of the abrasive disc shown in FIG. 2.

Referring to FIG. 4 which is a plan view of a modified embodiment of the abrasive disc shown in FIG. 2, a plurality of square pillar-form pellets having the same size as abrasive shaped articles are fitted to a supporting auxiliary 20 made of metal. The pellets are classified into two classes: those 21 which have a bulk density of group I (shown as black squares) and those 22 which have a bulk density of group II (shown as white squares). The pellets 21 and 22 are arranged on parallel lines so that the two kinds of pellets 21 and 22 are alternately arranged on each line. There is no great difference between the pellet arrangement in FIG. 4 and that in FIG. 3 in polishing performances of the abrasive disc.

It is preferable that, when at least two abrasive shaped articles are fitted to a supporting auxiliary, the polishing surface of the abrasive shaped articles fitted has a surface configuration conforming to the surface of a material to be polished whereby a maximum contact can be obtained between the polishing surface of the abrasive shaped articles and the surface of material to be polished, and polishing can be effected uniformly over the entire surface to be polished. For example, when the surface of material to be polished is flat, the polishing surface of the abrasive shaped articles is preferably flat, namely, the abrasive shaped articles are preferably fitted so that the heights of the shaped articles from the surface of supporting auxiliary are constant over the entire polishing surface. When the surface of material to be polished is curved, the polishing surface of the abrasive shaped articles is preferably similarly curved.

In a polishing step, the polishing surface of the abrasive shaped articles fitted on a supporting auxiliary is forced to be pressed against the surface of material to be polished, while at least one of the polishing surface and the surface of material to be polished is rotated. Therefore, the abrasive shaped articles are fitted onto the supporting auxiliary preferably in a manner such that each of the abrasive shaped articles having a bulk density of group II is adjacent to at least one of the abrasive shaped articles having a bulk density of group I.

The procedure by which the abrasive shaped articles are fitted to the supporting auxiliary includes for example, a procedure wherein the fitting is effected by using an adhesive and a procedure wherein the abrasive shaped articles are fitted into depressions formed on the surface of the supporting auxiliary. The adhesive used is not particularly limited, but is preferably an elastomeric adhesive which does not craze in the adhered part.

Polishing process

The polishing process of the present invention is characterized as using the above-mentioned abrasive disc comprising at least one abrasive shaped article. The polishing conditions under which the abrasive disc is used, and the polishing liquid are not particularly limited. For example, the use of a polishing liquid is optional, and, when it is used, a conventional polishing liquid is used which is, for example, an aqueous alkaline solution such as an aqueous potassium hydroxide solution. The abrasive disc used also is not particularly limited, provided that the above-mentioned abrasive shaped articles are fitted in a manner such that the entire polishing surface of the abrasive shaped articles is brought into direct contact with the material to be polished, and the abrasive shaped articles exhibit a high tenacity and are capable of polishing the material.

In the polishing process of the present invention, polishing can be conducted without use of a polishing cloth. The abrasive disc used in the present invention is more durable, i.e., has a longer operable life, than a polishing cloth. Further, a polishing liquid containing a minor amount of loose abrasive grains, or not containing loose abrasive grains, is used, and therefore, the problem of waste disposal can be mitigated or avoided. The polishing liquid is usually such that the light transmission at a wavelength of 600 nm of a waste polishing liquid is at least 10%, preferably at least 40% of the light transmission of water.

As examples of the material to be polished, there can be mentioned substrates for a semiconductor such as silicon wafer, gallium phosphorus substrate and gallium arsenic substrate, oxide substrates such as substrates of lithium niobate, lithium tantalate and lithium borate, and silica glass substrate; metallic materials; silica glass plates; and building stones. The material polished by using the abrasive disc of the present invention is beneficial in that undue abrading of the corner portions can be avoided or minimized, and thus, the abrasive disc can be advantageously used for polishing substrates, especially semiconductor substrates and oxide substrates. More advantageously, the abrasive is used for polishing a substrate capable of being subjected to etching, for example, a semiconductor substrate such as silicon wafer, because the rate of polishing can be more enhanced.

The invention will now be described specifically by the following examples.

Properties of abrasive shaped articles and polishing discs were determined as follows.

(1) Content of Silica (% by Weight)

The moisture content in a silica powder, the loss on ignition thereof and the contents of $Al_2O_3$, $Fe_2O_3$, $TiO_2$, CaO, MgO and $Na_2O$ therein are determined as follows, and the content of silica (A: % by weight) is determined by deducting the sum of the moisture content (a), the loss on ignition (b) and the contents (c) of $Al_2O_3$, $Fe_2O_3$, $TiO_2$, CaO, MgO and $Na_2O$ from the total weight (B) of the silica powder. Namely, the silica content (A) is calculated from the following equation.

$$A=[B-(a+b+c)]/[B-a]$$

The moisture content is calculated from the weights as measured before and after the silica powder is heated at 105° C. for 2 hours to remove moisture.

The loss on ignition is determined by heating the silica powder at 105° C. for 2 hours to remove moisture, and further heating the moisture-removed silica powder at 1,000° C., and calculating the heat loss from the weights as measured before and after the heating at 1,000° C.

The contents of $Al_2O_3$, $Fe_2O_3$, $TiO_2$, CaO, MgO and $Na_2O$ are determined by heating the silica powder at 105° C. for 2 hours to remove moisture, dissolving the moisture-removed silica powder, and measuring the respective elements by an ICP atomic emission spectrochemical analysis.

(2) Bulk Density of Silica Powder ($g/cm^3$)

In this specification, apparent density of silica powder ($g/cm^3$) is measured and the measured apparent density is assumed as bulk density of the silica powder. The measurement of the apparent density is conducted by a testing method of apparent density according to JIS (Japanese Industrial Standard) K5101 as measured under stationary conditions. A silica powder is passed through a sieve with a mesh size of 0.05 mm and fallen into a 30.0 $cm^3$ volume cylinder. When the fallen powder is heaped up, the heap of powder overflowing above the uppermost edge of the cylinder is removed, and the weight of the filled powder is measured. The bulk density of the silica powder is expressed by the formula (1):

$$E=W/30 \qquad (1)$$

wherein E is bulk density of powder ($g/cm^3$), W is weight (g) of the powder filled in the cylinder ($cm^3$), and "30" is the inner volume of the cylinder ($cm^3$). In the examples, the bulk density was expressed in unit "g/l".

(3) BET Specific Surface Area

A powdery sample is tested as it is. A sample of the shaped article is pulverized and then tested. Specific surface area is measured by a BET monadic method using a testing apparatus "MONOSORB" supplied by Quantachrome Co., U,S).

(4) Average Particle Diameter of Silica Powder ($\mu m$)

Average particle diameter of an ultrafine silica powder is measured by using Coulter LS130 supplied by Coulter Electronics Co. on a liquid module of powder. The measurement is made on the basis of volume.

(5) Bulk Density of Abrasive Shaped Article ($g/cm^3$)

A sample of abrasive shaped article with a plate-form having a size of 100 mm×100 mm×15 mm (thickness) is prepared. The sample weight is measured by an electronic force balance and the dimensions thereof are measured by a micrometer. The bulk density is calculated from the weight and dimensions of sample.

(6) Average Diameter ($\mu m$) of Particles in Abrasive Shaped Article

A part of a sample abrasive shaped article is flattened and the surface of the flattened portion is observed by a scanning electron microscope "ISI DS-130" supplied by Akashi Seisakusho K. K. The average particle diameter is calculated by an interceptive method.

(7) Compressive Strength ($kg/cm^2$) of Abrasive Shaped Article

A sample of abrasive shaped article with a plate-form having a size of 10 mm×10 mm×5 mm (thickness) is prepared. The compressive strength is measured according to JIS R-1608 by using SHIMADZU Autograph IS-10T supplied by Shimadzu Corp. while a load is applied at a cross head speed of 0.5 mm/min.

(8) Microporous Structure of Abrasive Shaped Article—Pore Mode Diameter, Pore Median Diameter, Pore Size Distribution and Pore Volume Porosity of an abrasive shaped article is measured by a method using a mercury porosimeter ("Poresizer 9320" supplied by Shimadzu Corp.) while mercury is penetrated therein at a pressure varying from 0 to 270 MPa. Namely mercury is forced to penetrate into pores in the abrasive shaped article, and the porosity is determined by calculation of the minimum pore diameter into which mercury is penetrated and the total volume of pores with a diameter of at least equal to the minimum pore diameter, from the volume of penetrated mercury and the applied pressure according to the Washburn formula. Usually the calculated pore diameter and the total pore volume are calibrated, and pore mode diameter and pore median diameter are determined from the calibrated pore diameter and the total pore volume.

The pore mode diameter means the pore diameter at which the differentiated value becomes maximum in the integral pore size distribution. The pore median diameter means the pore diameter corresponding to the central value between the maximum and minimum values of the integrated total pore volume in the integral pore size distribution. These values of pore mode diameter and pore median diameter are on the basis of volume.

(9) Surface State of Polished Material

The surface of polished material is observed by an optical microscope BH-2 supplied by Olympus Optical Co. The evaluation results are expressed by the following two ratings.

Rating A: the surface is very smooth and there is no scratch.

Rating B: the surface is not smooth and cannot be uniformly abraded.

(10) Surface Precision of Polished Material

The surface precision of polished material is evaluated by using a universal surface tester SE-3C supplied Kosaka Kenkyusho K. K. More specifically the center line average surface roughness (Ra) and the maximum height (Rmax; $\mu$m) are measured at a cut off value of at least 0.8 mm and a measurement length of 2.5 mm according to JIS (Japanese Industrial Standard) B-0601. A measurement length (L) of the center line of a roughness curve is taken, and, assuming that the center line is "x" axis and a line perpendicular to the fixes axis is "y" axis, and the roughness curve (y) is expressed by the formula (2):

$$y = f(x) \quad (2),$$

the center line average roughness (Ra) is expressed by the following equation (3):

$$Ra\ (\mu m) = (1/L) \int_0^L |f(x)| dx \quad (3)$$

The maximum height (Rmax) is determined as follows. A standard length is taken from the surface cross-section line, and the taken cross-section line is sandwiched between two parallel straight lines. The distance between the two parallel straight lines is the maximum height (Rmax; $\mu$m).

In Example 10 and Comparative Example 5, to more minutely and precisely examine the surface roughness (Ra) of a polished lithium tantalate substrate, a method of measuring the repulsion force in the contact mode is employed wherein an atomic force microscope (AFM) SPI 3600 supplied by SII Co. is used. The measurement is conducted on three regions each having a size of 2 $\mu$m×2 $\mu$m, and Ra is expressed as the center line average surface roughness.

(11) Undue Abrasion in Corner Portions of Polished Material

An ingot of lithium tantalate monocrystal is cut by a wire saw, and then, both surfaces thereof are subjected to lapping to give a lithium tantalate substrate. After the lithium tantalate substrate is subjected to a polishing test, the cut surface of the polished lithium tantalate substrate is observed by a scanning electron microscope "ISI DS-130" supplied by Akashi Seisakusho K. K. to determine undue abrasion in the corner portions of the polished substrate.

(12) Durability of Abrasive Shaped Article

An abrasive silica disc sample having a diameter of 280 mm and a thickness of 15 mm is prepared. A polishing test is continued, and the silica disc sample is taken every one hour to observe the presence of cracks, crazes and other surface defects on the polishing surface by the naked eye. The durability of the silica disc sample is expressed by the time (hours) spanning from the start of polishing to the time at which the surface defect is found.

(13) Rate of Abrasion

The rate of abrasion of material to be polished is expressed by the reduction of thickness of the material per unit time, which is calculated from the thickness as measured before and after polishing. In Examples 10 to 18 and Comparative Examples 4 and 5, the abrasion rate is expressed by the thickness reduction ($\mu$m) per 8 hours.

Production of Abrasive Shaped Article, Evaluation Thereof and Polishing Test

EXAMPLE 1

A powdery raw material of precipitated silica, prepared by a wet process and having the characteristics shown in Table 1, was press-molded at a pressure of 50 kg/cm$^2$ by a hydraulic press to give a disc having a diameter of 280 mm and a thickness of 15 mm, and the silica disc was sintered at 900° C. for 2 hours in a sintering furnace (type 51668 supplied by Koyo Lindberg Co.) to give an abrasive silica disc.

The bulk density, BET specific surface area, average particle diameter, compression strength, integrated pore volume, pore mode diameter and pore median diameter of the abrasive silica disc were evaluated. The results are shown in Table 2.

The abrasive silica disc was surface-finished and fitted to a metal disc of a small-scale flat surface polishing apparatus FPM-30 supplied by Copal Electronic Co. A square silicon wafer having a size of 20 mm×20 mm was polished by the silica disc-fitted metal disc at a metal disc revolution of 50 rpm and a pressure of 580 g/cm$^2$. During polishing, an aqueous potassium hydroxide solution (pH=12) as a polishing liquid was dropped at 30° C. onto the polishing surface at a rate of 150 ml/hour. The state of the polished surface, the surface precision thereof and the durability of the abrasive silica disc were evaluated. The results are shown in Table 2.

EXAMPLE 2

A powdery raw material of precipitated silica, prepared by a wet process and having the characteristics shown in Table 1, was combined with paraffin wax ("SP-0145" supplied by Nippon Seiro K. K.) at a blending ratio of silica powder/paraffin wax=4/1 by volume. The silica/paraffin wax blend was mixed at 150° C. for 30 minutes to give a powdery mixture. The powdery mixture was press-molded at a pressure of 100 kg/cm$^2$ by a hydraulic press to give a disc having a diameter of 280 mm and a thickness of 15 mm, and the disc was heated at 400° C. under a pressure of 1.5 kg/cm$^2$ in a nitrogen atmosphere in a pressurized oven (supplied by Nemus Co.), and then, sintered at 900° C. for 2 hours in a sintering furnace to give an abrasive silica disc.

The properties of the abrasive silica disc were evaluated. The results are shown in Table 2.

A polishing test was conducted by the same procedure as mentioned in Example 1. The test results are shown in Table 2.

EXAMPLE 3

A powdery raw material of precipitated silica, prepared by a wet process and having the characteristics shown in Table 1, was combined with paraffin wax ("SP-0145" supplied by Nippon Seiro K. K.) at a blending ratio of silica powder/paraffin wax=4/1 by volume. The silica/paraffin wax blend was mixed at 150° C. for 30 minutes to give a powdery mixture. The powdery mixture was press-molded at a pressure of 100 kg/cm$^2$ by a hydraulic press to give a disc having a diameter of 280 mm and a thickness of 15 mm. From this disc, an abrasive silica disc was prepared by the same procedure as described in Example 2.

The properties of the abrasive silica disc were evaluated. The results are shown in Table 2.

A polishing test was conducted by the same procedure as mentioned in Example 1. The test results are shown in Table 2.

EXAMPLE 4

A powdery raw material of precipitated silica, prepared by a wet process and having the characteristics shown in Table 1, was combined with an acrylic binder ("Rika-bond SA-200" supplied by Chuou Rika Kogyo K. K.) and stearic acid emulsion ("Cellozol 920" supplied by Chukyo Yushi K. K.) at a blending ratio of silica powder/acrylic binder (based on solid content)/stearic acid emulsion (based on solid content)/water=100/17/1/251 by weight. The blend was mixed to give an aqueous slurry. The slurry was spray-dried by using a spray dryer (type "LT-8" supplied by Okawara Kakoki k. k.) to give a granular material. The granular material was press-molded at a pressure of 100 kg/cm$^2$ by a hydraulic press to give a disc having a diameter of 280 mm and a thickness of 15 mm. The disc was heated at 400° C. under a pressure of 1.5 kg/cm$^2$ in a nitrogen atmosphere in a pressurized oven, and then, sintered at 950° C. for 2 hours in a sintering furnace to give an abrasive silica disc.

The properties of the abrasive silica disc were evaluated. The results are shown in Table 2.

A polishing test was conducted by the same procedure as mentioned in Example 1. The test results are shown in Table 2.

EXAMPLE 5

A powdery raw material of precipitated silica, prepared by a wet process and having the characteristics shown in Table 1, was pre-molded into granules by a hydraulic press at a pressure of 50 kg/cm$^2$, and the granules were classified by a stainless steel sieve with a 32 mesh size to give a granular raw material. The granular raw material was press-molded at a pressure of 100 kg/cm$^2$ by a hydraulic press to give a disc having a diameter of 280 mm and a thickness of 15 mm, and then, the disc was sintered at 900° C. for 2 hours in a sintering furnace to give an abrasive silica disc.

The properties of the abrasive silica disc were evaluated. The results are shown in Table 2.

A polishing test was conducted by the same procedure as mentioned in Example 1. The test results are shown in Table 2.

EXAMPLE 6

A powdery raw material of precipitated silica, prepared by a wet process and having the characteristics shown in Table 1, was pre-molded into granules by a hydraulic press at a pressure of 30 kg/cm$^2$, and the granules were classified by a stainless steel sieve with a 32 mesh size to give a granular raw material. The granular raw material was press-molded at a pressure of 100 kg/cm$^2$ by a hydraulic press to give a disc having a diameter of 280 mm and a thickness of 15 mm, and then, the disc was sintered at 975° C. for 2 hours in a sintering furnace to give an abrasive silica disc.

The properties of the abrasive silica disc were evaluated. The results are shown in Table 2.

A polishing test was conducted by the same procedure as mentioned in Example 1. The test results are shown in Table 2.

EXAMPLE 7

A powdery raw material of precipitated silica, prepared by a wet process and having the characteristics shown in Table 1, was pre-molded into granules by a hydraulic press at a pressure of 50 kg/cm$^2$, and the granules were classified by a stainless steel sieve with a 32 mesh size to give a granular raw material. The granular raw material was press-molded at a pressure of 100 kg/cm$^2$ by a hydraulic press to give a disc having a diameter of 280 mm and a thickness of 15 mm, and then, the disc was sintered at 975° C. for 2 hours in a sintering furnace to give an abrasive silica disc.

The properties of the abrasive silica disc were evaluated. The results are shown in Table 2.

A polishing test was conducted by the same procedure as mentioned in Example 1. The test results are shown in Table 2.

EXAMPLE 8

A powdery raw material of precipitated silica, prepared by a wet process and having the characteristics shown in Table 1, was pre-molded, classified and then press-molded by the same procedures as those described in Example 6 to give a disc having a diameter of 280 mm and a thickness of 15 mm. The disc was sintered at 1,000° C. for 2 hours in a sintering furnace to give an abrasive silica disc.

The properties of the abrasive silica disc were evaluated. The results are shown in Table 2. A polishing test was conducted by the same procedure as mentioned in Example 1. The test results are shown in Table 2.

EXAMPLE 9

A powdery raw material of precipitated silica, prepared by a wet process and having the characteristics shown in Table 1, was pre-molded into granules by a hydraulic press at a pressure of 30 kg/cm$^2$, and the granules were classified by a stainless steel sieve with a 32 mesh size to give a granular raw material. The granular raw material was press-molded at a pressure of 100 kg/cm$^2$ by a hydraulic press to give a disc having a diameter of 280 mm and a thickness of 15 mm, and then, the disc was sintered at 1,000° C. for 8 hours in a sintering furnace to give an abrasive silica disc.

The properties of the abrasive silica disc were evaluated. The results are shown in Table 2. A polishing test was conducted by the same procedure as mentioned in Example 1. The test results are shown in Table 2.

COMPARATIVE EXAMPLE 1

A powdery raw material of precipitated silica, prepared by a wet process and having the characteristics shown in Table 1, was press-molded at a pressure of 100 kg/cm$^2$ by a hydraulic press to give a disc having a diameter of 280 mm and a thickness of 15 mm, and then, the disc was sintered at 1,300° C. for 2 hours in a sintering furnace (type "SUPER-C" supplied by Motoyama k. k.) to give an abrasive silica disc.

The properties of the abrasive silica disc were evaluated. The results are shown in Table 2. A polishing test was conducted by the same procedure as mentioned in Example 1. The test results are shown in Table 2.

COMPARATIVE EXAMPLE 2

A polishing suede pad ("SURFIN 018-3" supplied by Fujimi Inc.) was fitted to a metal disc of a small-scale flat surface polishing apparatus "FPM-30" supplied by Copal Electronic Co. A square silicon wafer having a size of 20 mm×20 mm was polished by the polishing suede pad at a metal disc revolution of 50 rpm and a pressure of 580 g/cm$^2$. During polishing, an aqueous dispersion (pH=12) containing 10% by weight of silica (commercially available colloidal silica [silicon dioxide content: 20% by weight; "COMPOL 80" supplied by Fujimi Inc.]) as a polishing liquid was dropped at 30° C. onto the polishing surface at a rate of 150 ml/hour. The surface precision of the polished silicon wafer was evaluated. The results are shown in Table 2.

As seen from the comparison of Examples 1 to 9 with Comparative Examples 1 and 2 in Table 1 and Table 2, the abrasive shaped article of the present invention gives an abrasive disc which can be advantageously used for polishing and by which a polished surface with a surface precision of the same degree as that achieved by the conventional polishing method using a polishing pad.

TABLE 1

|  | Examples |  |  |  |  |  |  |  |  | Com Ex |
|---|---|---|---|---|---|---|---|---|---|---|
| Example No. | 1 | 2 | 3 | 4 | 5 | 6 | 7 | 8 | 9 | 1 |
| Silica content (wt %) | 94 | 95 | 93 | 93 | 93 | 96 | 93 | 96 | 93 | 99 |
| Impurities (wt %) |  |  |  |  |  |  |  |  |  |  |
| Moisture | 6 | 5 | 7 | 5 | 7 | 5 | 7 | 5 | 7 | — |
| Ignition loss | 4.9 | 5.8 | 5.8 | 5.8 | 5.8 | 3.0 | 5.8 | 3.0 | 5.8 | — |
| $Al_2O_3$ | 0.55 | 0.52 | 0.48 | 0.52 | 0.61 | 0.44 | 0.61 | 0.44 | 0.48 | — |
| $Fe_2O_3$ | 0.04 | 0.05 | 0.06 | 0.05 | 0.04 | 0.05 | 0.04 | 0.05 | 0.06 | 0.0002 |
| $TiO_2$ | 0.09 | 0.08 | 0.06 | 0.08 | 0.07 | 0.07 | 0.07 | 0.07 | 0.06 | — |
| CaO | 0.02 | 0.02 | 0.02 | 0.02 | 0.02 | 0.02 | 0.02 | 0.02 | 0.02 | — |
| MgO | 0.01 | 0.01 | 0.01 | 0.01 | 0.01 | 0.01 | 0.01 | 0.01 | 0.01 | — |
| $Na_2O$ | 0.41 | 0.43 | 0.53 | 0.43 | 0.48 | 0.38 | 0.48 | 0.38 | 0.53 | — |
| Bulk density of silica powder (g/l) | 70 | 80 | 25 | 80 | 52 | 40 | 52 | 40 | 25 | 55 |
| BET specific surface area (m$^2$/g) | 159 | 37 | 227 | 37 | 132 | 172 | 132 | 172 | 227 | 202 |
| Average particle diameter (μm) | 26.2 | 5.2 | 7.1 | 5.2 | 6.2 | 6.1 | 6.2 | 6.1 | 7.1 | 46.6 |

TABLE 2

|  | Examples |  |  |  |  |  |  |  |  | Comp. Example |  |
|---|---|---|---|---|---|---|---|---|---|---|---|
| Example No. | 1 | 2 | 3 | 4 | 5 | 6 | 7 | 8 | 9 | 1 | 2 |
| Bulk density (g/cm$^3$) | 0.38 | 0.60 | 0.44 | 0.71 | 0.53 | 0.73 | 0.81 | 1.04 | 1.16 | 1.78 | — |
| BET specific surface area (m$^2$/g) | 138 | 25 | 112 | 23 | 46 | 55 | 51 | 31 | 12 | 2 | — |
| Average particle diameter (μm) | 0.022 | 0.109 | 0.026 | 0.111 | 0.059 | 0.050 | 0.053 | 0.088 | 0.227 | — | — |
| Compressive strength (kg/cm$^2$) | 57 | 46 | 68 | 125 | 48 | 105 | 177 | 356 | 348 | — | — |
| Integrated pore volume (cm$^3$/g) | 2.26 | 1.15 | 1.58 | 0.92 | 1.39 | 0.91 | 0.66 | 0.50 | 0.37 | 0.11 | — |
| ≦1 μm (%) | 96 | 99 | 99 | 99 | 98 | 98 | 93 | 95 | 81 | — | — |
| ≦0.1 μm (%) | 71 | 15 | 86 | 20 | 44 | 77 | 66 | 65 | 37 | — | — |
| Mode diameter (μm) | 0.041 | 0.155 | 0.032 | 0.193 | 0.119 | 0.045 | 0.028 | 0.039 | 0.066 | — | — |
| Median diameter (μm) | 0.061 | 0.148 | 0.043 | 0.160 | 0.118 | 0.059 | 0.048 | 0.067 | 0.172 | — | — |
| Polished state | A | A | A | A | A | A | A | A | A | B | — |
| Center line average roughness Ra | 0.006 | 0.006 | 0.006 | 0.006 | 0.006 | 0.006 | 0.006 | 0.006 | 0.006 | — | 0.006 |
| Maximum height Rmax | 0.04 | 0.04 | 0.04 | 0.04 | 0.04 | 0.04 | 0.04 | 0.04 | 0.04 | — | 0.04 |
| Durability (hour) | 20 | 60 | 40 | 90 | 60 | 80 | >90 | >90 | >90 | >90 | — |

EXAMPLE 10

A powdery raw material of precipitated silica, prepared by a wet process and having the characteristics shown in Table 3, was press-molded into a disc, and then, the disc was sintered to give an abrasive silica disc, by the same procedures as described in Example 2.

The properties of the abrasive silica disc were evaluated by the same procedures as described in Example 1. The results are shown in Table 4.

An abrasive silica columnar disc sample having a diameter of 25 mm and a thickness of 5 mm was prepared from the above-mentioned precipitated silica powder by the same procedures as described above. 96 of the abrasive silica columnar disc sample were fitted to a rotational disc (having a diameter of 360 mm) of a high-speed lens polishing apparatus in a pattern similar to that illustrated in FIG. 1, and the fitted 96 abrasive silica discs were surface-finished to render flat the disc surfaces. Six lithium tantalate substrates each having a diameter of 3 inches were simultaneously polished by the abrasive silica columnar disc-fitted rotational disc at a disc revolution of 100 rpm under the polishing conditions shown in Table 4. The abrasion rate shown in Table 4 was calculated from the thicknesses of the lithium tantalate substrates as measured before and after polishing. During polishing, an aqueous potassium hydroxide solution (pH=12) as a polishing liquid was dropped at 25° C. onto the polishing surface and circulated at a rate of 100 ml/min.

The state of the polished surface, the surface precision thereof and the durability of the abrasive silica disc were evaluated. The results are shown in Table 4.

Figure 5A:
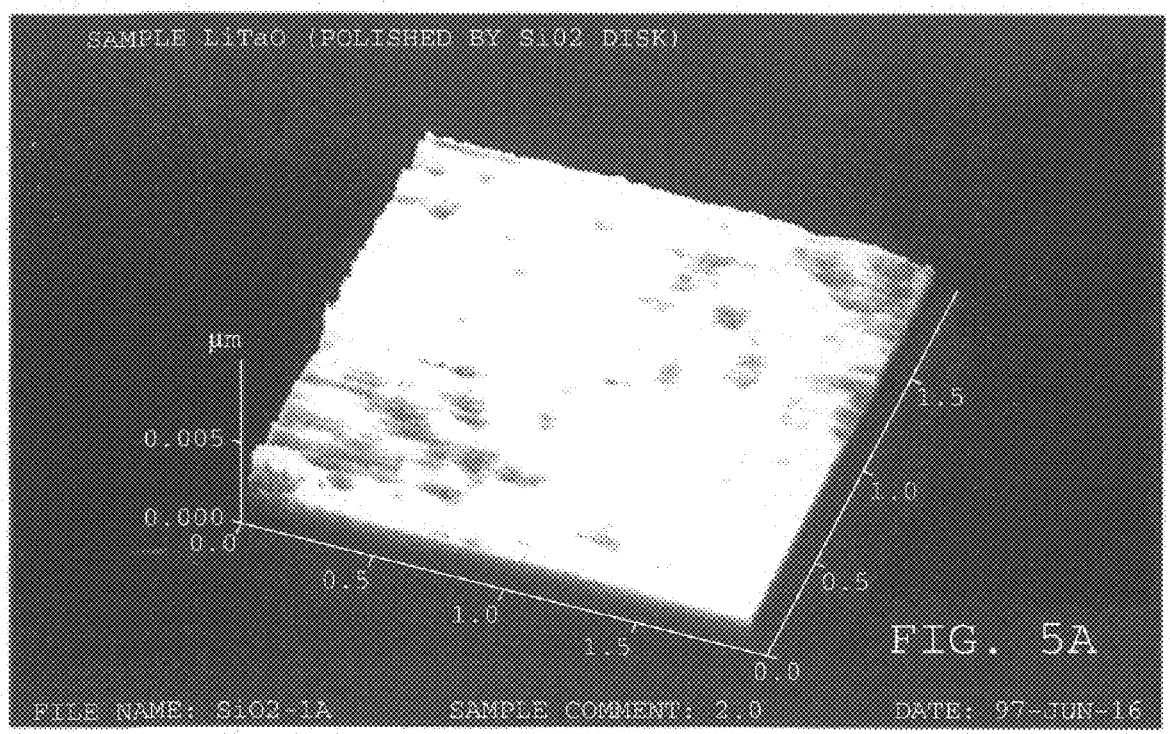
FIG. 5A is a perspective microphotograph of a surface polished by the process of the present invention using the abrasive shaped article.
Figure 5B:
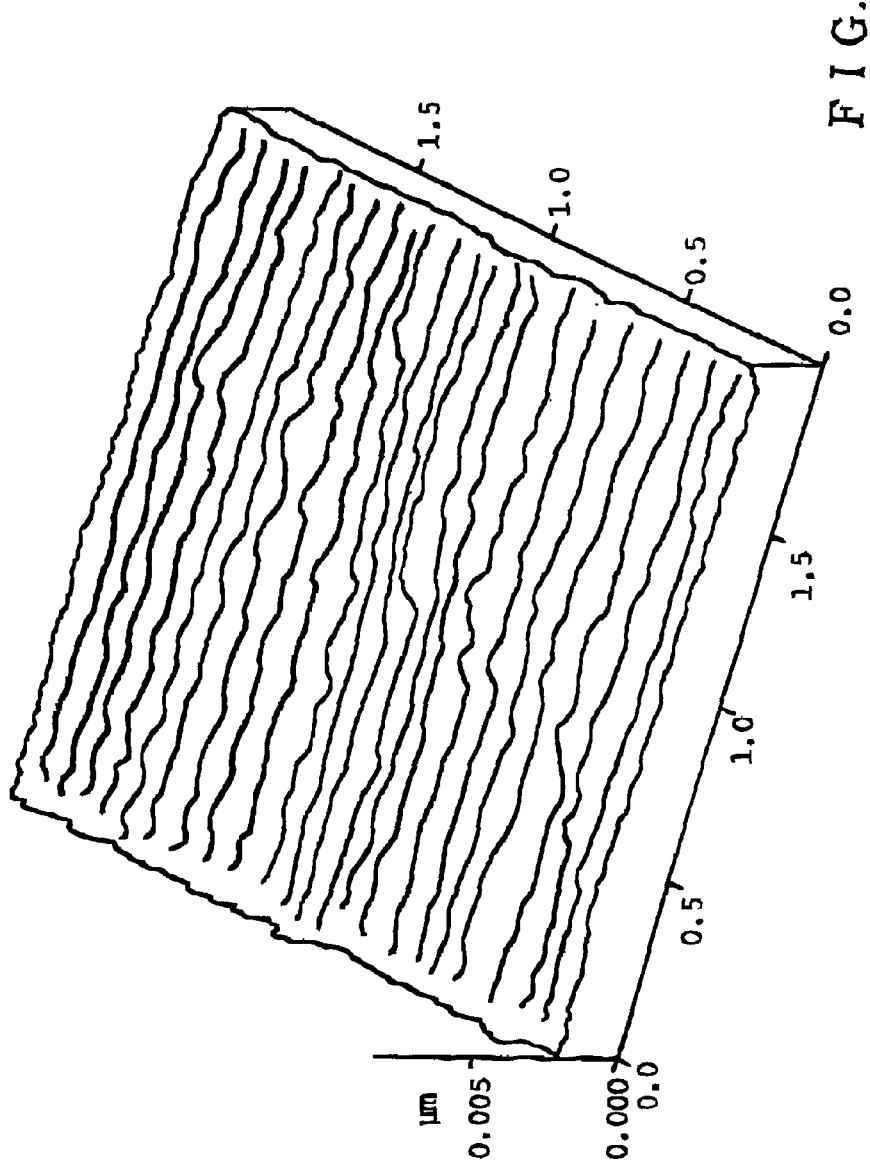
FIG. 5B is a sketch of the microphotograph shown in FIG. 5A.

To more minutely and precisely examine the state of polished surfaces of the lithium tantalate substrates, the center line average surface roughness (Ra) was measured by an atomic force microscope (AFM). Ra was 0.151 nm. An electron photomicrograph by the AFM is shown in its sketch is shown in FIG. 5A and FIG. 5B.

Figure 7:
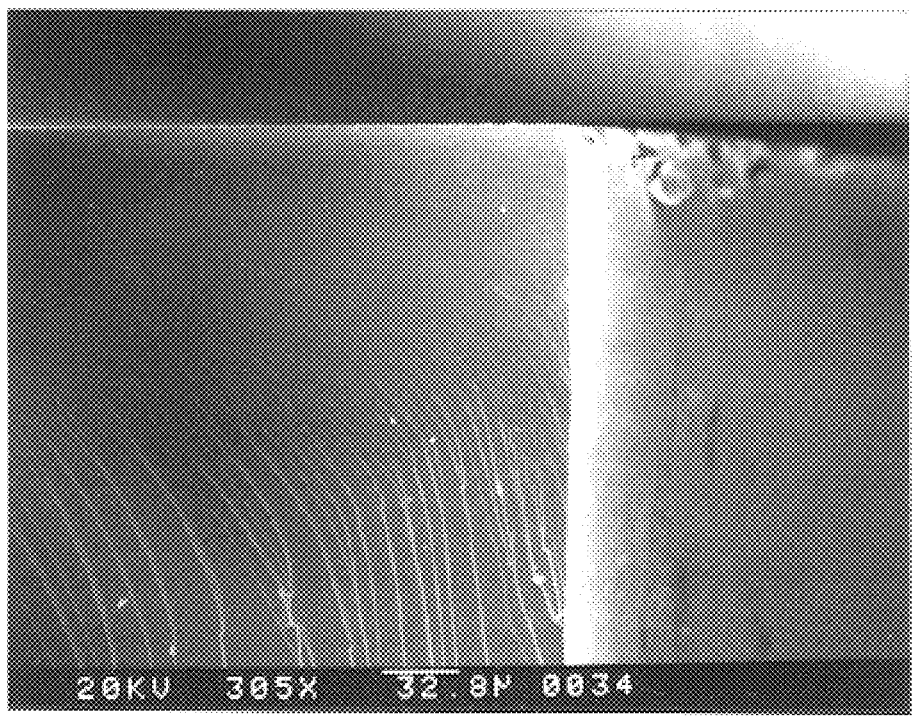
FIG. 7 is a microphotograph showing a corner portion of a substrate before polishing.
Figure 8:
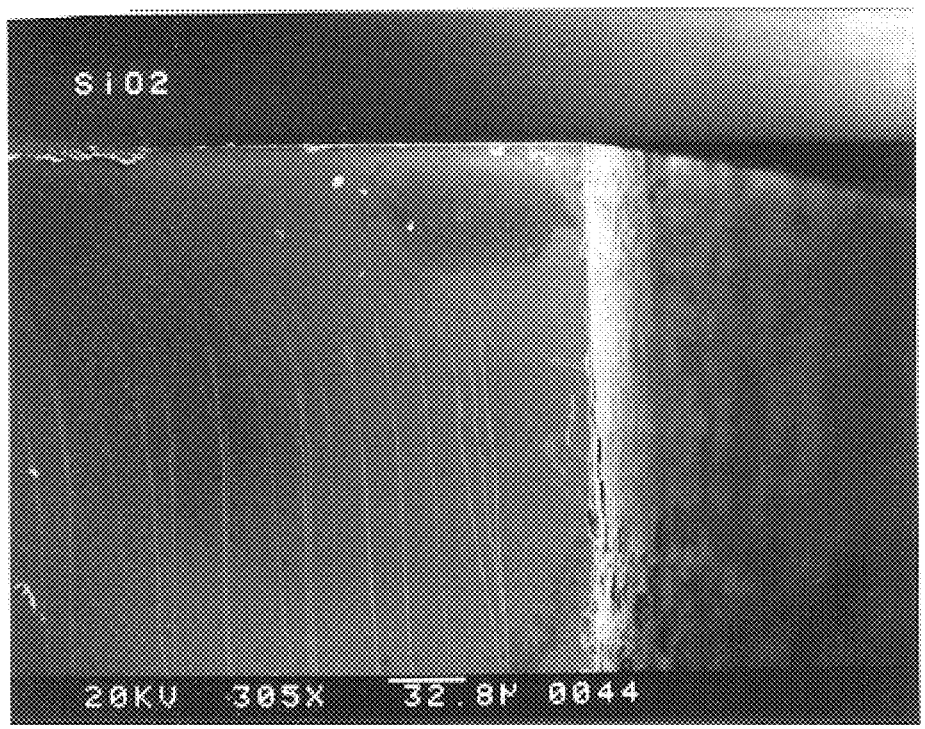
FIG. 8 is a microphotograph showing a corner portion of a substrate polished by the process of the present invention using the abrasive shaped article.

The cut surface of the polished lithium tantalate substrate was observed by a scanning electron microscope (SEM) to examine undue abrasion in corner portions of the polished substrate. An electron photomicrograph of an end portion of the cut surface of the polished substrate by the SEM is shown in FIG. 8, wherein reference numerals 26, 27 and 28 represent the cut surface, an edge face of the substrate and the polished surface, respectively. For comparison, an electron microphotograph of an end portion of the cut surface of the unpolished lithium tantalate substrate by the SEM is shown in FIG. 7, wherein reference numerals 23, 24 and 25 represent the cut surface, an edge face of the substrate and the surface to be polished, respectively.

EXAMPLE 11

An abrasive silica disc was made by the same procedures as described in Example 1 from a powdery raw material of precipitated silica, prepared by a wet process and having the characteristics shown in Table 3.

The properties of the abrasive silica disc were evaluated by the same procedures as described in Example 1. The results are shown in Table 4.

A polishing test was conducted by the same procedures as mentioned in Example 10 except that the rate of abrasion was varied as shown in Table 4. The test results are shown in Table 4.

EXAMPLE 12

An abrasive silica disc was made by the same procedures as described in Example 4 from a powdery raw material of precipitated silica, prepared by a wet process and having the characteristics shown in Table 3.

The properties of the abrasive silica disc were evaluated by the same procedures as described in Example 1. The results are shown in Table 4.

A polishing test was conducted by the same procedures as mentioned in Example 10 and under the polishing conditions shown in Table 4. The test results are shown in Table 4.

EXAMPLE 13

An abrasive silica disc was made by the same procedures as described in Example 5 from a powdery raw material of precipitated silica, prepared by a wet process and having the characteristics shown in Table 3.

The properties of the abrasive silica disc were evaluated by the same procedures as described in Example 1. The results are shown in Table 4.

A polishing test was conducted by the same procedures as mentioned in Example 10 and under the polishing conditions shown in Table 4. The test results are shown in Table 4.

EXAMPLE 14

An abrasive silica disc was made by the same procedures as described in Example 8 from a powdery raw material of precipitated silica, prepared by a wet process and having the characteristics shown in Table 3.

The properties of the abrasive silica disc were evaluated by the same procedures as described in Example 1. The results are shown in Table 4.

A polishing test was conducted by the same procedures as mentioned in Example 10 and under the polishing conditions shown in Table 4. The test results are shown in Table 4.

EXAMPLE 15

A silica shaped article was prepared by the same procedures as described in Example 6 from a powdery raw material of precipitated silica, prepared by a wet process and having the characteristics shown in Table 3. An abrasive silica disc was made by the same procedures as described in Example 9 from the silica shaped article.

The properties of the abrasive silica disc were evaluated by the same procedures as described in Example 1. The results are shown in Table 4.

A polishing test was conducted by the same procedures as mentioned in Example 10 except that the rate of abrasion was varied as shown in Table 4. The test results are shown in Table 4.

EXAMPLE 16

An abrasive silica disc was made by the same procedures as described in Example 10 from a powdery raw material of precipitated silica, prepared by a wet process and having the characteristics shown in Table 3.

The properties of the abrasive silica disc were evaluated by the same procedures as described in Example 1. The results are shown in Table 4.

A polishing test was conducted by the same procedures as mentioned in Example 10 except that the rate of abrasion was varied as shown in Table 4. The test results are shown in Table 4.

COMPARATIVE EXAMPLE 3

An abrasive silica disc was made by the same procedures as described in Comparative Example 1 from a powdery raw material of precipitated silica, prepared by a wet process and having the characteristics shown in Table 3.

The properties of the abrasive silica disc were evaluated by the same procedures as described in Example 1. The results are shown in Table 4.

A polishing test was conducted by the same procedures as mentioned in Example 10 and under the polishing conditions shown in Table 4. The test results are shown in Table 4.

COMPARATIVE EXAMPLE 4

A polishing suede pad ("SURFIN 018-3" supplied by Fujimi Inc.) was fitted to a rotational disc (with a diameter of 360 mm) of a high-speed lens-polishing apparatus. A lithium tantalate substrate was polished by the suede pad-fitted rotational disc at a disc revolution of 100 rpm under the polishing conditions shown in Table 4. During polishing, an aqueous potassium hydroxide solution (pH=12) as a polishing liquid was dropped onto the polishing surface and circulated at a rate of 100 ml/minute.

The state of the polished surface, the surface precision thereof and the durability of the abrasive silica disc were evaluated. The results are shown in Table 4. In this comparative example, the rate of abrasion was proved to be very slow.

As seen from the comparison of Examples 10 to 16 with Comparative Examples 3 and 4, the abrasive shaped article of the present invention gives an abrasive disc which can be advanatgeously used for polishing and by which, even when a loose abrasive grains are not used, a polished surface with a surface precision of the same degree as that achieved by the conventional abrasive disc can be obtained.

EXAMPLE 17

An abrasive silica disc was made by the same procedures as described in Example 12 from a powdery raw material of precipitated silica, prepared by a wet process and having the characteristics shown in Table 3.

The properties of the abrasive silica disc were evaluated by the same procedures as described in Example 1. The results are shown in Table 4.

A polishing test was conducted by the same procedures as mentioned in Example 10 except that the polishing conditions were varied as shown in Table 4, and an aqueous dispersion (pH=12, temperature=25° C.) containing 4% by weight (as silicon dioxide) of commercially available colloidal silica ("Compol 80:" supplied by Fujimi Inc.; silicon dixide content: 20% by weight) was used as a polishing liquid instead of the aqueous potassium hydroxide solution. The test results are shown in Table 4.

EXAMPLE 18

An abrasive silica disc was made by the same procedures as described in Example 12 from a powdery raw material of precipitated silica, prepared by a wet process and having the characteristics shown in Table 3.

The properties of the abrasive silica disc were evaluated by the same procedures as described in Example 1. The results are shown in Table 4.

A polishing test was conducted by the same procedures as mentioned in Example 10 except that the polishing conditions were varied as shown in Table 4, and an aqueous dispersion (pH=12, temperature=25° C.) containing 8% by weight (as silicon dioxide) of commercially available colloidal silica ("Compol 80" supplied by Fujimi Inc.; silicon dixide content: 20% by weight) was used as a polishing liquid instead of the aqueous potassium hydroxide solution. The test results are shown in Table 4.

COMPARATIVE EXAMPLE 5

A polishing suede pad ("SURFIN 018-3:" supplied by Fujimi Inc.) was fitted to a rotational disc (with a diameter of 360 mm) of a high-speed lens-polishing apparatus. A lithium tantalate substrate was polished by the suede pad-fitted rotational disc at a disc revolution of 100 rpm under the polishing conditions shown in Table 4. During polishing, an an aqueous dispersion (pH=12) containing 20% by weight (as silicon dioxide) of commercially available colloidal silica ("Compol 80" supplied by Fujimi Inc., silicon dioxide content: 20% by weight) as a polishing liquid was dropped at 25° C. onto the polishing surface and circulated.

The state of the polished surface, the surface precision thereof and the durability of the abrasive silica disc were evaluated. The results are shown in Table 4.

Figure 6A:
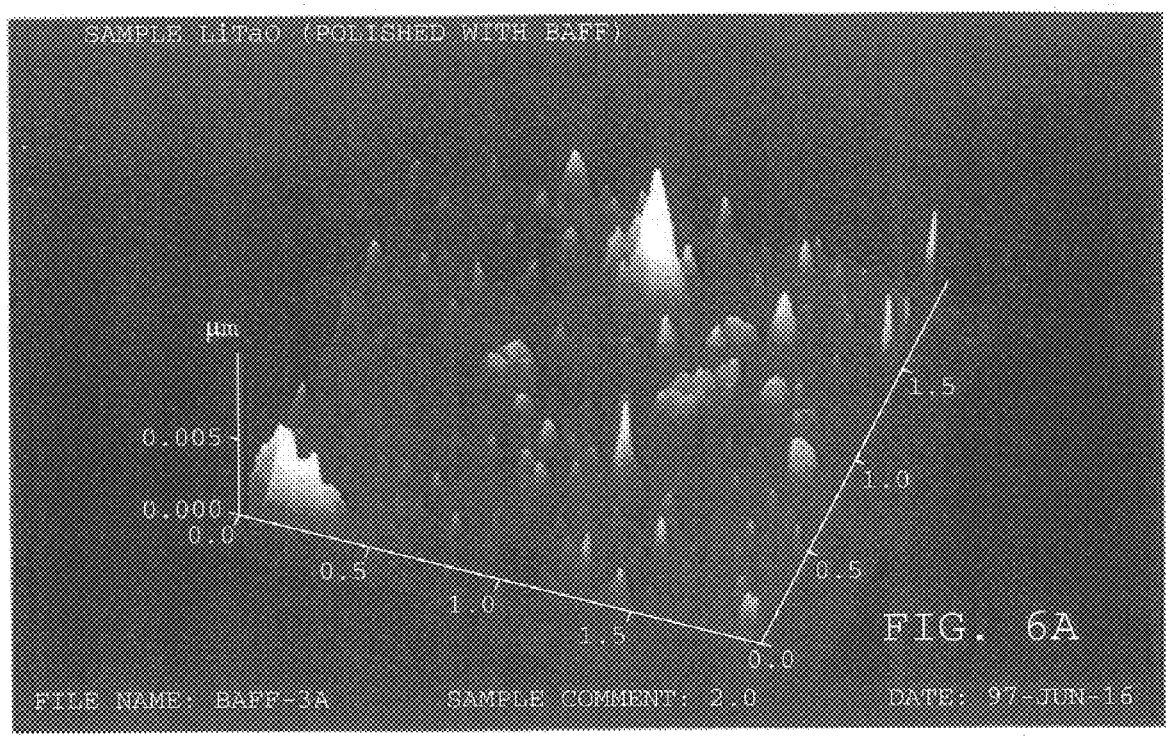
FIG. 6A is a perspective microphotograph of a surface polished by a conventional polishing procedure using a polishing cloth.
Figure 6B:
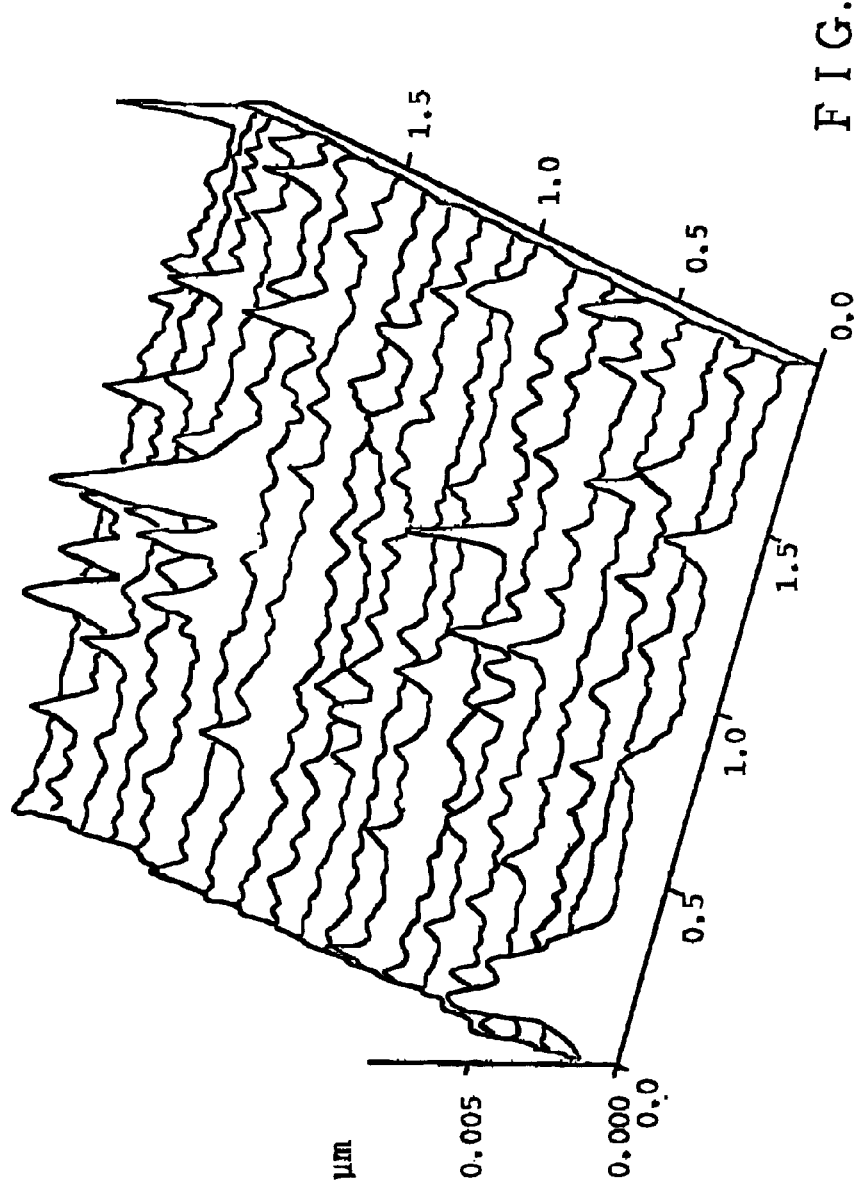
FIG. 6B is a sketch of the microphotograph shown in FIG. 6A.

To more minutely and precisely examine the state of polished surfaces of the lithium tantalate substrates, the center line average surface roughness (Ra) was measured by an atomic force microscope (AFM). Ra was 0.397 nm. An electron photomicrograph by the AFM is shown in FIG. 6A and in FIG. 6B.

To examine undue abrasion its sketch is shown in corner portions of the polished substrate, an end portion of the cut surface of the polished lithium tantalate substrate was observed by a scanning electron microscope (SEM). An electron photo-micrograph of an end portion of the cut surface of the polished substrate by the SEM is shown in FIG. 9, wherein reference numerals 29, 30 and 31 represent the cut surface, the polished surface and the unduly abraded corner portion, respectively.

As seen from the comparison of Examples 17 and 18 with Comparative Example 3, the abrasive shaped article of the present invention gives an abrasive disc which can be advanatgeously used for polishing and by which, even when a loose abrasive grains are used in a minor amount, a polished surface with a surface precision of the same degree as that achieved by the conventional abrasive disc can be obtained.

As seen from the comparison of a minute and precise examination of the polished surface states between Example 10 (FIG. 5A; FIG. 5B) and Comparative Example 5 (FIG. 6A and FIG. 6B), an abrasive disc comprising the abrasive shaped article of the present invention gives a uniform and smooth polished surface as compared with the use of the conventional polishing cloth.

Figure 9:
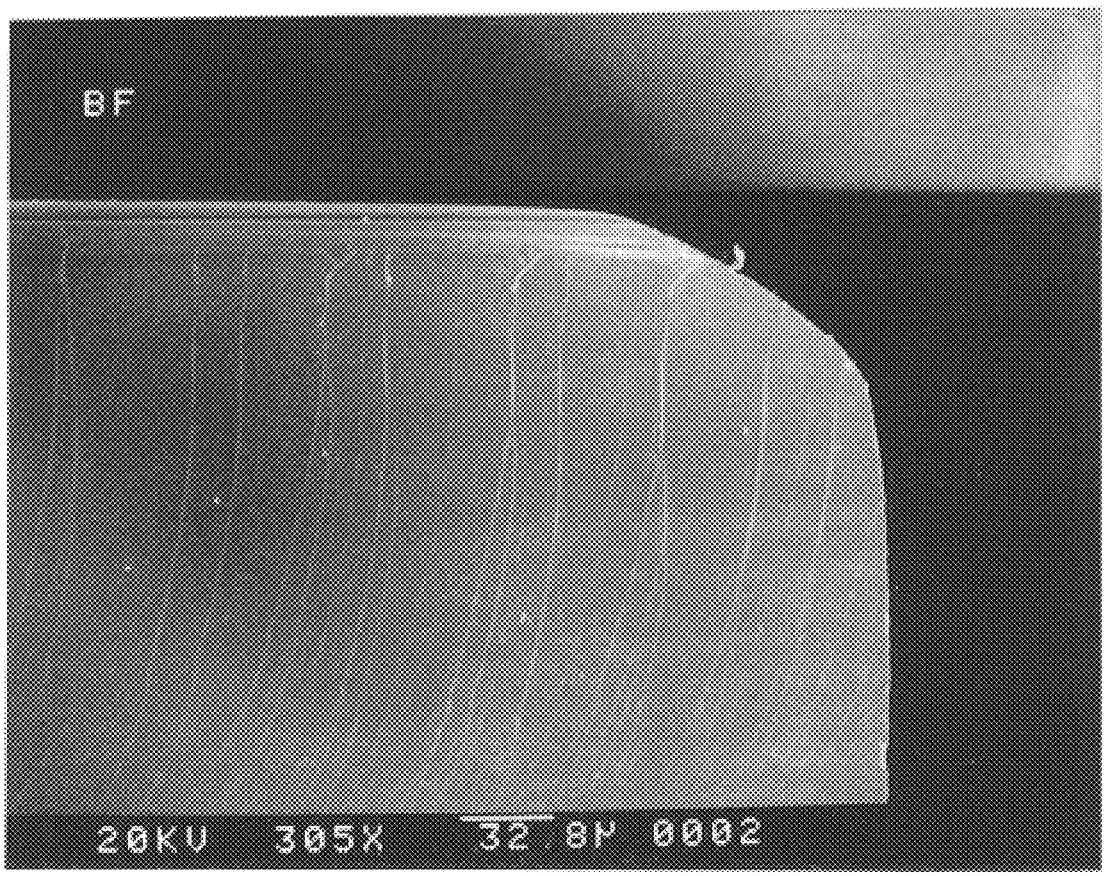
FIG. 9 is a microphotograph showing a corner portion of a substrate polished by a conventional polishing procedure using a polishing cloth.

Further, as seen from the comparison of undue abrasion in the corner portions of the substrates between Example 10 (FIG. 8) and Comparative Example 5 (FIG. 9), and the comparison of FIG. 8 and FIG. 9 with the corner portions of the unpolished substrate (FIG. 7), the undue abrasion in the corner portions of substrate by the use of the abrasive shaped article of the present invention (FIG. 8) is negligible and the appearance of the corner portions thereof is approximately the same as that of the unpolished substrate (FIG. 7). In contrast, the undue abrasion in the corner portions of substrate by the use of the conventional polishing cloth is large (FIG. 9).

TABLE 3

|  | Examples | | | | | | | | | Com Ex |
|---|---|---|---|---|---|---|---|---|---|---|
| Example No. | 10 | 11 | 12 | 13 | 14 | 15 | 16 | 17 | 18 | 3 |
| Silica content (wt %) | 95 | 94 | 93 | 93 | 96 | 93 | 93 | 99 | 93 | 93 |
| Impurities (wt %) | | | | | | | | | | |
| Moisture | 5 | 6 | 5 | 7 | 5 | 7 | 7 | — | 5 | 5 |
| Ignition loss | 5.8 | 4.9 | 5.8 | 5.8 | 3.0 | 5.8 | 5.8 | — | 5.8 | 5.8 |
| $Al_2O_3$ | 0.52 | 0.55 | 0.52 | 0.61 | 0.44 | 0.48 | 0.48 | — | 0.52 | 0.52 |
| $Fe_2O_3$ | 0.05 | 0.04 | 0.05 | 0.04 | 0.05 | 0.06 | 0.06 | 0.0002 | 0.05 | 0.05 |
| $TiO_2$ | 0.08 | 0.09 | 0.08 | 0.07 | 0.07 | 0.06 | 0.06 | — | 0.08 | 0.08 |
| CaO | 0.02 | 0.02 | 0.02 | 0.02 | 0.02 | 0.02 | 0.02 | — | 0.02 | 0.02 |
| MgO | 0.01 | 0.01 | 0.01 | 0.01 | 0.01 | 0.01 | 0.01 | — | 0.01 | 0.01 |
| $Na_2O$ | 0.43 | 0.41 | 0.43 | 0.48 | 0.38 | 0.53 | 0.53 | — | 0.43 | 0.43 |
| Bulk density of silica powder (g/l) | 80 | 70 | 80 | 52 | 40 | 25 | 25 | 55 | 80 | 80 |
| BET specific surface area ($m^2$/g) | 37 | 159 | 37 | 132 | 172 | 227 | 227 | 202 | 37 | 37 |
| Average particle diameter ($\mu$m) | 5.2 | 26.2 | 5.2 | 6.2 | 6.1 | 7.1 | 7.1 | 46.6 | 5.2 | 5.2 |

TABLE 4

|  | Examples | | | | | | | Com. Examples | | Examples | | Co. Ex. |
|---|---|---|---|---|---|---|---|---|---|---|---|---|
| Example No. | 10 | 11 | 12 | 13 | 14 | 15 | 16 | 3 | 4 | 17 | 18 | 5 |
| Abrasive shaped article | | | | | | | | | | | | |
| Bulk density (g/$cm^3$) | 0.60 | 0.38 | 0.71 | 0.81 | 1.04 | 1.16 | 0.44 | 1.78 | — | 0.71 | 0.71 | — |
| BET specific surface area ($m^2$/g) | 25 | 138 | 23 | 51 | 31 | 12 | 112 | 2 | — | 23 | 23 | — |
| Average particle diameter ($\mu$m) | 0.109 | 0.022 | 0.111 | 0.053 | 0.088 | 0.227 | 0.026 | — | — | 0.111 | 0.111 | — |
| Compressive strength (kg/$cm^2$) | 46 | 57 | 125 | 177 | 356 | 348 | 68 | — | — | 125 | 125 | — |
| Integrated pore volume ($cm^3$/g) | 1.15 | 2.26 | 0.92 | 0.66 | 0.50 | 0.37 | 1.58 | 0.11 | — | 0.92 | 0.92 | — |
| $\leq$1 $\mu$m (%) | 99 | 96 | 99 | 93 | 96 | 81 | 99 | — | — | 99 | 99 | — |
| $\leq$0.1 $\mu$m (%) | 15 | 71 | 20 | 66 | 65 | 37 | 86 | — | — | 20 | 20 | — |
| Mode diameter ($\mu$m) | 0.155 | 0.041 | 0.193 | 0.028 | 0.039 | 0.066 | 0.032 | — | — | 0.193 | 0.193 | — |
| Median diameter ($\mu$m) | 0.148 | 0.061 | 0.160 | 0.048 | 0.067 | 0.172 | 0.043 | — | — | 0.160 | 0.160 | — |
| Polishing conditions | | | | | | | | | | | | |
| Pressure (g/$cm^2$) | 118 | 118 | 118 | 118 | 118 | 118 | 118 | 118 | 118 | 118 | 118 | 118 |
| Concentration of loose grains (wt %) | 0 | 0 | 0 | 0 | 0 | 0 | 0 | 0 | 0 | 4 | 8 | 20 |
| Rate of abrasion ($\mu$m/8 hrs) | 3.0 | 3.5 | 3.0 | 3.0 | 3.0 | 2.5 | 3.5 | — | <1 | 5.0 | 7.0 | 3.0 |
| Polished surface | | | | | | | | | | | | |
| Polished state | A | A | A | A | A | A | A | B | *1 | A | A | — |
| Center line average roughness Ra | 0.006 | 0.006 | 0.006 | 0.006 | 0.006 | 0.006 | 0.006 | — | — | 0.006 | 0.006 | 0.006 |
| Maximum height Rmax | 0.04 | 0.04 | 0.04 | 0.04 | 0.04 | 0.04 | 0.04 | — | — | 0.04 | 0.04 | 0.04 |
| Durability (hours) | >90 | 20 | >90 | >90 | >90 | >90 | 40 | >90 | — | >90 | >90 | — |

*1 Even when polishing was continued for 24 hours, the thickness of substrate was not reduced.

EXAMPLE 19

Two kinds of abrasive silica discs were prepared, which had a bulk density falling in group I and a bulk density falling in group II, respectively, and their properties were evaluated as follows.

An abrasive silica disc with a bulk density of group I having a diameter of 25 mm and a thickness of 5 mm was prepared by the same procedures as described in Example 4 from a powdery raw material of precipitated silica, prepared by a wet process and having the characteristics shown in Table 5, column I. The properties of the abrasive silica disc of group I were evaluated by the same procedures as described in Example 1. The results are shown in Table 6.

An abrasive silica disc with a bulk density of group II having a diameter of 25 mm and a thickness of 5 mm was prepared by the same procedures as described in Example 1 from a powdery raw material of precipitated silica, prepared by a wet process and having the characteristics shown in Table 5, column II. The properties of the abrasive silica disc of group II were evaluated by the same procedures as described in Example 1. The results are shown in Table 6.

A polishing test was conducted as follows. The abrasive silica disc of group I and the abrasive silica disc of group II were surface-finished so that the polishing surfaces were made flat. Then 74 of the abrasive silica disc of group I and 39 of the abrasive silica disc of group II were fitted to a metal disc of a small scale flat surface polishing apparatus FPM-30 supplied by Copal Electronic Co. in a pattern similar to that shown in FIG. 1 wherein each abrasive silica disc of group II was adjacent to at least one abrasive silica disc of group I, to prepare a polishing disc. A square lithium niobate plate having a size of 20 mm×20 mm was polished by the polishing disc fitted with the abrasive silica discs of group I and group II at a polishing disc revolution of 50 rpm and a pressure of 150 g/cm$^2$. During polishing, an aqueous potassium hydroxide solution (pH=12) as a polishing liquid was dropped at 30° C. onto the polishing surface at a rate of 150 ml/hour. The state of the polished surface, the surface precision thereof and the durability of the abrasive silica discs were evaluated. The results are shown in Table 6.

EXAMPLE 20

Two kinds of abrasive silica discs were prepared, which had a bulk density falling in group I and a bulk density falling in group II, respectively, and their properties were evaluated as follows.

An abrasive silica disc with a bulk density of group I having a diameter of 25 mm and a thickness of 5 mm was prepared by the same procedures as described in Example 8 from a powdery raw material of precipitated silica, prepared by a wet process and having the characteristics shown in Table 5, column I. The properties of the abrasive silica disc of group I were evaluated by the same procedures as described in Example 1. The results are shown in Table 6.

An abrasive silica disc with a bulk density of group II was prepared from a powdery raw material of precipitated silica, prepared by a wet process and having the characteristics shown in Table 5, column II. Namely the powdery raw material was pre-molded into granules by a hydraulic press at a pressure of 30 kg/cm$^2$, and the granules were classified by a stainless steel sieve with a 32 mesh size to give a granular raw material. The granular raw material was press-molded at a pressure of 33 kg/cm$^2$ by a hydraulic press to give a disc having a diameter of 25 mm and a thickness of 5 mm. The disc was sintered at 700° C. for 2 hours in a sintering furnace to give an abrasive silica disc with a bulk density of group II. The properties of the abrasive silica disc of group II were evaluated by the same procedures as described in Example 1. The results are shown in Table 6.

A polishing test was conducted by the same procedures as employed in Example 19. The results are shown in Table 6.

EXAMPLE 21

Two kinds of abrasive silica discs were prepared, which had a bulk density falling in group I and a bulk density falling in group II, respectively, and their properties were evaluated as follows.

An abrasive silica disc with a bulk density of group I having a diameter of 25 mm and a thickness of 5 mm was prepared by the same procedures as described in Example 9 from a powdery raw material of precipitated silica, prepared by a wet process and having the characteristics shown in Table 5, column I. The properties of the abrasive silica disc of group I were evaluated by the same procedures as described in Example 1. The results are shown in Table 6.

An abrasive silica disc with a bulk density of group II was prepared from a powdery raw material of precipitated silica, prepared by a wet process and having the characteristics shown in Table 5, column II. Namely the powdery raw material was press-molded at a pressure of 100 kg/cm$^2$ by a hydraulic press to give a disc having a diameter of 25 mm and a thickness of 5 mm. The disc was sintered at 700° C. for 2 hours in a sintering furnace to give an abrasive silica disc with a bulk density of group II. The properties of the abrasive silica disc of group II were evaluated by the same procedures as described in Example 1. The results are shown in Table 6.

A polishing test was conducted by the same procedures as employed in Example 19. The results are shown in Table 6.

EXAMPLE 22

Two kinds of abrasive silica discs were prepared, which had a bulk density falling in group I and a bulk density falling in group II, respectively, and their properties were evaluated as follows.

An abrasive silica disc with a bulk density of group I having a diameter of 25 mm and a thickness of 5 mm was prepared by the same procedures as described in Example 7 from a powdery raw material of precipitated silica, prepared by a wet process and having the characteristics shown in Table 5, column I. The properties of the abrasive silica disc of group I were evaluated by the same procedures as employed in Example 1. The results are shown in Table 6.

An abrasive silica disc with a bulk density of group II having a diameter of 25 mm and a thickness of 5 mm was prepared by the same procedures as described in Example 10 from a powdery raw material of precipitated silica, prepared by a wet process and having the characteristics shown in Table 5, column II. The properties of the abrasive silica disc of group II were evaluated by the same procedures as employed in Example 1. The results are shown in Table 6.

A polishing test was conducted by the same procedures as employed in Example 19. The results are shown in Table 6.

EXAMPLE 23

Two kinds of abrasive silica discs were prepared, which had a bulk density falling in group I and a bulk density falling in group II, respectively, and their properties were evaluated as follows.

An abrasive silica disc with a bulk density of group I was prepared from a powdery raw material of precipitated silica, prepared by a wet process and having the characteristics shown in Table 5, column I. Namely the powdery raw material was pre-molded into granules by a hydraulic press at a pressure of 50 kg/cm$^2$, and the granules were classified by a stainless steel sieve with a 32 mesh size to give a granular raw material. The granular raw material was press-molded at a pressure of 100 kg/cm$^2$ by a hydraulic press to give a disc having a diameter of 25 mm and a thickness of 5 mm. The disc was sintered at 975° C. for 2 hours in a sintering furnace to give an abrasive silica disc with a bulk density of group I. The properties of the abrasive silica disc of group I were evaluated by the same procedures as employed in Example 1. The results are shown in Table 6.

An abrasive silica disc with a bulk density of group II was prepared from a powdery raw material of precipitated silica, prepared by a wet process and having the characteristics shown in Table 5, column II. Namely the powdery raw material was combined with paraffin wax ("SP-0145" supplied by Nippon Seiro K. K.) at a blending ratio of silica powder/paraffin wax=4/1 by volume. The silica powder/paraffin wax blend was mixed uniformly at 150° C. for 30 minutes to give a powdery mixture. The powdery mixture was press-molded at a pressure of 100 kg/cm² by a hydraulic press to give a disc having a diameter of 25 mm and a thickness of 5 mm. The disc was heated at 400° C. under a pressure of 1.5 kg/cm² in a nitrogen atmosphere in a pressurized oven, and then, sintered at 950° C. for 2 hours in a sintering furnace to give an abrasive silica disc. The properties of the abrasive silica disc of group II were evaluated by the same procedures as described in Example 1. The results are shown in Table 6.

A polishing test was conducted by the same procedures as employed in Example 19. The results are shown in Table 6.

COMPARATIVE EXAMPLE 6

A powdery raw material of precipitated silica, prepared by a wet process and having the characteristics shown in Table 5, was press-molded at a pressure of 10 kg/cm² by a hydraulic press to give a silica disc. The silica disc was sintered at 1,300° C. for 2 hours in a sintering furnace (type "SUPER-C" supplied by Motoyama K. K.) to give an abrasive silica disc.

The properties of the abrasive silica disc were evaluated. The results are shown in Table 6. A polishing test was conducted by the same procedures as mentioned in Example 19. The results are shown in Table 6.

COMPARATIVE EXAMPLE 7

A polishing suede pad ("SURFIN 018-3" supplied by Fujimi Inc.) was fitted to a rotational metal disc of a small-scale flat surface polishing apparatus ("FPM-30" supplied by Copal Electronic Co.). A lithium niobate substrate was polished by the suede pad-fitted rotational disc at a disc revolution of 50 rpm under a pressure of 150 kg/cm². During polishing, an an aqueous dispersion (pH=12) containing 20% by weight (as silicon dioxide) of commercially available colloidal silica ("Compol 80" supplied by Fujimi Inc.) as a polishing liquid was dropped at 30° C. onto the polishing surface at a rate of 150 ml/hour.

The surface precision of the polished surface was evaluated. The results are shown in Table 6.

As seen from the comparison of Examples 19 to 23 with Comparative Examples 6 and 7, the abrasive shaped article of the present invention gives an abrasive disc which can be advantageously used for polishing and by which a polished surface with a surface precision of the same degree as that achieved by the conventional abrasive disc can be obtained.

TABLE 5

| Example | Examples | | | | | | | | | | Comp. |
|---|---|---|---|---|---|---|---|---|---|---|---|
| | 19 | | 20 | | 21 | | 22 | | 23 | | |
| No. | I | II | I | II | I | II | I | II | I | II | Ex. 6 |
| Silica content (wt %) | 93 | 94 | 96 | 96 | 93 | 93 | 93 | 95 | 96 | 96 | 99 |
| Impurities (wt %) | | | | | | | | | | | |
| Moisture | 5 | 6 | 5 | 5 | 7 | 7 | 7 | 5 | 5 | 5 | — |
| Ignition loss | 5.8 | 4.9 | 3 | 3 | 5.8 | 5.8 | 5.8 | 5.8 | 3 | 3 | — |
| $Al_2O_3$ | 0.52 | 0.55 | 0.44 | 0.44 | 0.48 | 0.48 | 0.61 | 0.52 | 0.44 | 0.44 | — |
| $Fe_2O_3$ | 0.05 | 0.04 | 0.05 | 0.05 | 0.06 | 0.06 | 0.04 | 0.05 | 0.05 | 0.05 | 0.0002 |
| $TiO_2$ | 0.08 | 0.09 | 0.07 | 0.07 | 0.06 | 0.06 | 0.07 | 0.08 | 0.07 | 0.07 | — |
| CaO | 0.02 | 0.02 | 0.02 | 0.02 | 0.02 | 0.02 | 0.02 | 0.02 | 0.02 | 0.02 | — |
| MgO | 0.01 | 0.01 | 0.01 | 0.01 | 0.01 | 0.01 | 0.01 | 0.01 | 0.01 | 0.01 | — |
| $Na_2O$ | 0.43 | 0.41 | 0.38 | 0.38 | 0.53 | 0.53 | 0.48 | 0.43 | 0.38 | 0.38 | — |
| Bulk density of silica powder (g/l) | 80 | 70 | 40 | 40 | 25 | 25 | 52 | 80 | 40 | 40 | 55 |
| BET specific surface area (m²/g) | 37 | 159 | 172 | 172 | 227 | 227 | 132 | 37 | 172 | 172 | 202 |
| Average particle diameter (μm) | 5.2 | 26.2 | 6.1 | 6.1 | 7.1 | 7.1 | 6.2 | 5.2 | 6.1 | 6.1 | 46.6 |

TABLE 6

| Example | Example | | | | | | | | | | Comparative Example | |
|---|---|---|---|---|---|---|---|---|---|---|---|---|
| | 19 | | 20 | | 21 | | 22 | | 23 | | | |
| No. | I | II | I | II | I | II | I | II | I | II | 6 | 7 |
| Abrasive shaped article | | | | | | | | | | | | |
| Bulk density (g/cm³) | 0.71 | 0.38 | 1.04 | 0.36 | 1.16 | 0.28 | 0.81 | 0.60 | 0.73 | 0.44 | 1.78 | — |
| BET specific surface area (m²/g) | 23 | 138 | 31 | 123 | 12 | 176 | 51 | 25 | 55 | 96 | 2 | — |
| Average particle diameter (μm) | 0.111 | 0.022 | 0.088 | 0.053 | 0.227 | 0.015 | 0.053 | 0.109 | 0.05 | 0.03 | — | — |
| Compressive strength (kg/cm²) | 125 | 57 | 356 | 4 | 348 | 3 | 177 | 46 | 105 | 15 | — | — |
| Integrated pore volume (cm³/g) | 0.92 | 2.26 | 0.50 | 2.35 | 0.37 | 3.14 | 0.66 | 1.15 | 0.91 | 1.79 | 0.11 | — |

TABLE 6-continued

|  | Example | | | | | | | | | | Comparative Example | |
|---|---|---|---|---|---|---|---|---|---|---|---|---|
| Example No. | 19 | | 20 | | 21 | | 22 | | 23 | | 6 | 7 |
|  | I | II | I | II | I | II | I | II | I | II | | |
| ≤1 μm (%) | 99 | 96 | 95 | 90 | 81 | 84 | 93 | 99 | 98 | 96 | — | — |
| ≤0.1 μm (%) | 20 | 71 | 65 | 57 | 37 | 49 | 66 | 15 | 77 | 75 | — | — |
| Mode diameter (μm) | 0.193 | 0.041 | 0.039 | 0.032 | 0.066 | 0.018 | 0.028 | 0.155 | 0.045 | 0.053 | — | — |
| Median diameter (μm) | 0.160 | 0.061 | 0.067 | 0.065 | 0.172 | 0.114 | 0.048 | 0.148 | 0.059 | 0.054 | — | — |
| No. of discs fitted | 74 | 39 | 74 | 39 | 74 | 39 | 74 | 39 | 74 | 39 | 113 | — |
| Polished surface | | | | | | | | | | | | |
| Polished state | A | | A | | A | | A | | A | | B | — |
| Center line average roughness Ra | 0.006 | | 0.006 | | 0.006 | | 0.006 | | 0.006 | | — | 0.006 |
| Maximum height Rmax | 0.04 | | 0.04 | | 0.04 | | 0.04 | | 0.04 | | — | 0.04 |
| Durability (hour) | 90 | | >90 | | >90 | | >90 | | 80 | | >90 | — |

Evaluation of Waste Polishing Liquid

EXAMPLE 24

The waste polishing liquid produced in the polishing test described in Example 1 was evaluated. The turbidity thereof was examined by spectrophotometer (type "Ubest-55" supplied by Nippon Bunko K. K.), and expressed by a spectral transmission (%) at a wavelength of 600 nm with reference to that of purified water as a reference standard. The result is shown in Table 7. A large turbidity means that the content of loose abrasive grains in the waste polishing liquid is large. A small turbidity means that the content of loose abrasive grains is small.

EXAMPLES 25 TO 46

The waste polishing liquids produced in the polishing tests described in Examples 2 through 23 were evaluated for their turbidities by the same spectrophotometry as described in Example 24. The results are shown in Table 7.

COMPARATIVE EXAMPLES 8 TO 11

The waste polishing liquids produced in the polishing tests conducted in Comparative Examples 2, 4, 5 and 7 were evaluated for their turbidities by the same spectrophotometry as described in Example 24. The results are shown in Table 7.

As seen from the comparison of Examples 24 through 46 with Comparative Examples 8 through 11 in Table 7, when an abrasive disc of the present invention is used, the waste polishing liquid produced exhibits a larger spectral transmission than that of the waste polishing liquid produced in the conventional polishing process using a polishing pad. Thus the content of loose grains in the waste polishing liquid is very small. This reveals that, when loose grains are not used or when loose grains are used in a small amount, a rate of abrasion approximately equal to that of the conventional process using a polishing pad can be obtained, and therefore, the problem of waste polishing liquid disposal can be avoided or mitigated.

TABLE 7

| Example | Waste polishing liquid (Ex. No.) | Transmittance (%) | Example | Waste polishing liquid (Ex. No.) | Transmittance (%) |
|---|---|---|---|---|---|
| 24 | 1 | 79 | 38 | 15 | 92 |
| 25 | 2 | 86 | 39 | 16 | 83 |
| 26 | 3 | 83 | 40 | 17 | 22 |
| 27 | 4 | 89 | 41 | 18 | 12 |
| 28 | 5 | 85 | 42 | 19 | 87 |
| 29 | 6 | 89 | 43 | 20 | 90 |
| 30 | 7 | 90 | 44 | 21 | 90 |
| 31 | 8 | 92 | 45 | 22 | 89 |
| 32 | 9 | 92 | 46 | 23 | 87 |
| 33 | 10 | 86 | | | |
| 34 | 11 | 79 | C8 | C2 | 1 |
| 35 | 12 | 89 | C9 | C4 | 98 |
| 36 | 13 | 90 | C10 | C5 | 1 |
| 37 | 14 | 92 | C11 | C7 | 1 |

*C: Comparative Example

In the polishing process of the present invention, a polishing liquid containing no loose grains or containing a minor amount of loose grains is used, and therefore, the problem of waste polishing liquid disposal can be mitigated or avoided. This is in contrast with the conventional polishing process using a polishing pad wherein a waste polishing liquid containing a salient amount of loose grains is produced. Substrates such as silicon wafer and an oxide substrate, or other materials, polished by the process of the present invention, have a smooth surface which is similar to that obtained by the conventional polishing process. The abrasive shaped article fitted to an abrasive disc, used in the present invention, has good durability and thus the polishing process is economically advantageous and can be conducted with an enhanced efficiency.

What is claimed is:

1. An abrasive shaped article comprising at least 90% by weight, based on the weight of the abrasive shaped article, of silica, said abrasive shaped article being a molded article made by molding a silica powder, and having a bulk density of 0.2 g/cm$^3$ to 1.5 g/cm$^3$, a BET specific surface area of 10 m$^2$/g to 400 m$^2$/g and an average particle diameter of 0.001 μm to 0.5 μm."

2. An abrasive shaped article according to claim 1, which has an integrated total pore volume of 0.3 cm$^3$/g to 4 cm$^3$/g.

3. An abrasive shaped article according to claim 2, which has a pore size distribution such that the integrated pore volume of pores having a diameter not larger than 1 μm is at least 80% of the integrated total pore volume of the entire pores, the integrated pore volume of pores having a diameter not larger than 0.1 μm is at least 10% of the integrated total pore volume of the entire pores, the pore mode diameter is in the range of 0.01 μm to 0.3 μm, and the pore median diameter is in the range of 0.01 μm to 0.3 μm.

* * * * *